US011789280B2

(12) United States Patent
Wheelwright et al.

(10) Patent No.: US 11,789,280 B2
(45) Date of Patent: Oct. 17, 2023

(54) PERIPHERAL LIGHT FIELD DISPLAY

(71) Applicant: Meta Platforms Technologies, LLC, Menlo Park, CA (US)

(72) Inventors: Brian Wheelwright, Sammamish, WA (US); Kieran Connor Kelly, Seattle, WA (US); Ying Geng, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/938,639

(22) Filed: Oct. 6, 2022

(65) Prior Publication Data

US 2023/0049531 A1 Feb. 16, 2023

Related U.S. Application Data

(62) Division of application No. 17/382,179, filed on Jul. 21, 2021, now Pat. No. 11,493,772.

(60) Provisional application No. 63/214,606, filed on Jun. 24, 2021, provisional application No. 63/054,997, filed on Jul. 22, 2020.

(51) Int. Cl.
*G09G 5/00* (2006.01)
*G02B 27/01* (2006.01)
*G02B 27/00* (2006.01)
*G02B 27/30* (2006.01)

(52) U.S. Cl.
CPC ..... *G02B 27/0179* (2013.01); *G02B 27/0093* (2013.01); *G02B 27/0172* (2013.01); *G02B 27/30* (2013.01); *G02B 2027/013* (2013.01); *G02B 2027/014* (2013.01); *G02B 2027/0123* (2013.01); *G02B 2027/0187* (2013.01)

(58) Field of Classification Search
CPC ............ G02B 27/0179; G02B 27/0093; G02B 27/0172; G02B 27/30
USPC .......................................................... 345/8
See application file for complete search history.

(56) References Cited

U.S. PATENT DOCUMENTS

| 11,016,302 B2 | 5/2021 | Freeman et al. |
| 2012/0188148 A1 | 7/2012 | DeJong |
| 2014/0022286 A1 | 1/2014 | Chen et al. |

(Continued)

FOREIGN PATENT DOCUMENTS

| EP | 3633419 A1 | 4/2020 |
| JP | 2015172616 A | 10/2015 |

OTHER PUBLICATIONS

EPO—International Search report and Written Opinion for International Application No. PCT/US2022/035020, dated Nov. 28, 2022, 15 pages.

(Continued)

*Primary Examiner* — Jonathan M Blancha
(74) *Attorney, Agent, or Firm* — McDermott Will & Emery LLP

(57) ABSTRACT

A Head Mounted Display (HMD) includes a pixel array having multiple pixels configured in a two-dimensional surface, each pixel providing multiple light beams forming an image provided to a user. The HMD also includes a first optical element configured to provide a central portion of a field of view for the image through an eyebox that limits a volume including a pupil of the user, and a second optical element configured to provide a peripheral portion of the field of view for the image through the eyebox, wherein the peripheral portion of the field of view comprises at least one steradian of a user's field of view at a resolution of at least fifteen arcminutes.

18 Claims, 23 Drawing Sheets

(56) References Cited

U.S. PATENT DOCUMENTS

| | | |
|---|---|---|
| 2014/0266990 A1 | 9/2014 | Makino et al. |
| 2017/0055825 A1 | 3/2017 | Tumlinson |
| 2018/0003963 A1 | 1/2018 | Benitez et al. |
| 2018/0090052 A1 | 3/2018 | Marsh et al. |
| 2018/0217632 A1 | 8/2018 | Tseng et al. |
| 2019/0020869 A1 | 1/2019 | Perreault et al. |
| 2019/0045176 A1 | 2/2019 | Ratcliff et al. |
| 2019/0064526 A1 | 2/2019 | Connor |
| 2019/0107719 A1 | 4/2019 | Edwin et al. |
| 2019/0129174 A1 | 5/2019 | Perreault |
| 2019/0250405 A1 | 8/2019 | Leighton et al. |
| 2019/0356907 A1 | 11/2019 | Iguchi |
| 2020/0348518 A1 | 11/2020 | Georgiou et al. |
| 2022/0179214 A1 | 6/2022 | Lee et al. |

OTHER PUBLICATIONS

EPO—Invitation to Pay Additional Fees for International Application No. PCT/US2022/035014, Oct. 26, 2022, 11 pages.

Boger Y., "The VRGuy's Blog: Converting Diagonal Field of View and Aspect Ratio to Horizontal and Vertical Field of View," Apr. 23, 2016, [Retrieved on Jun. 4, 2022], 3 pages, Retrieved from internet: URL: http://vrguy.blogspot.com/2013/04/converting-diagonal-field-of-view-and.html.

EPO—Invitation to Pay Additional Fees for International Application No. PCT/US2022/035020, dated Oct. 5, 2022, 10 pages.

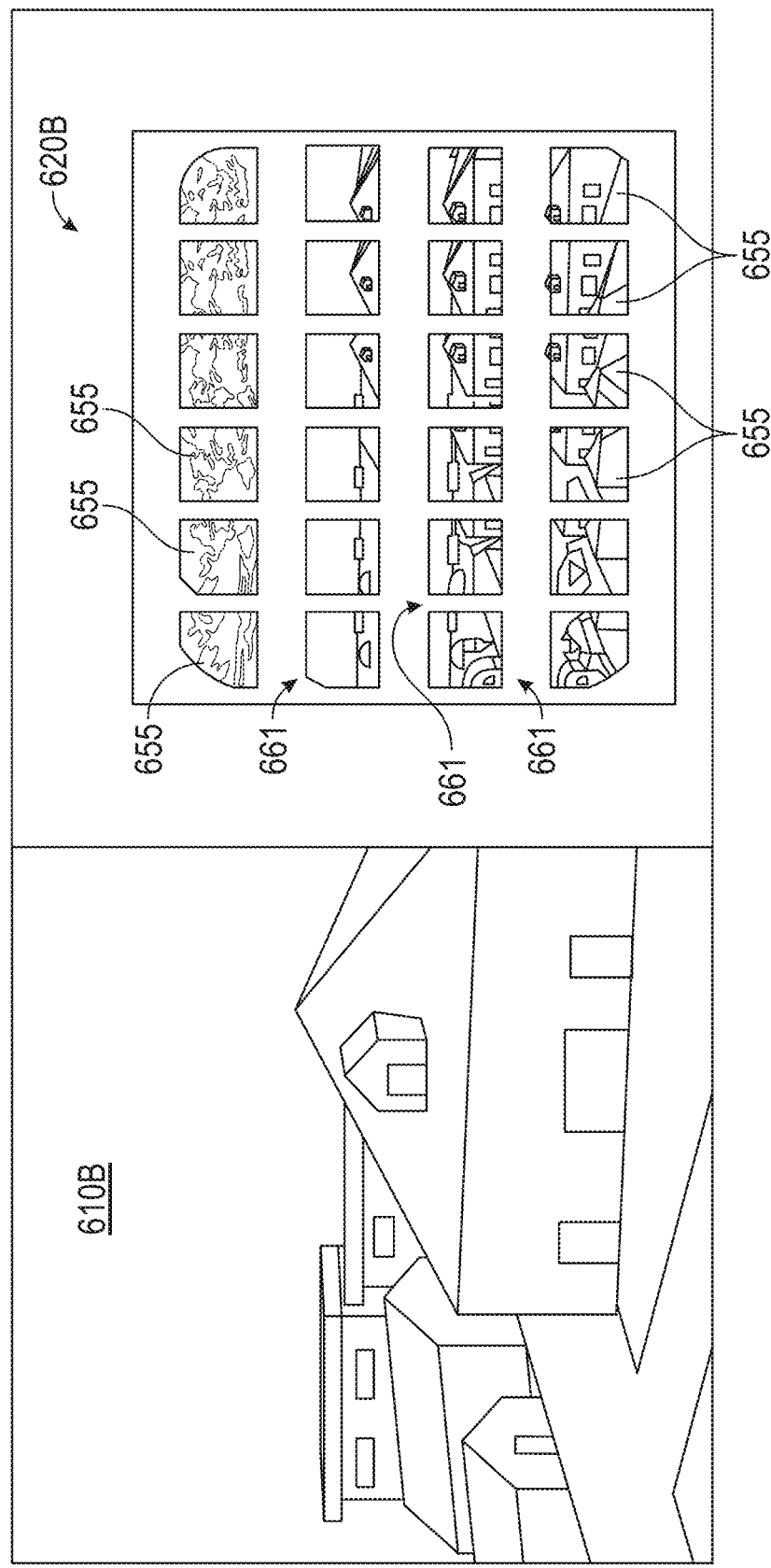

PERIPHERAL LIGHT FIELD DISPLAY

CROSS-REFERENCE TO RELATED APPLICATIONS

This application claims priority under 35 U.S.C. § 121 as a divisional of U.S. patent application Ser. No. 17/382,179, filed Jul. 21, 2021, which claims priority under 35 U.S.C. 119(e) to U.S. Prov. Pat. Appln. No. 63/054,997, entitled PERIPHERAL LIGHT FIELD DISPLAY, to Brian Wheelwright, et al., filed on Jul. 22, 2020, and to U.S. Prov. Pat. Appln. No. 63/214,606, entitled LIGHT FIELD DISPLAY FOR PERIPHERAL VIEW IN VIRTUAL REALITY HEADSETS, to Brian Wheelwright, et al., filed on Jun. 24, 2021, the contents of which applications are hereby incorporated by reference in their entirety, for all purposes.

BACKGROUND

Field

The present disclosure is related to headsets for use in virtual reality (VR) applications that include peripheral view. More specifically, the present disclosure is related to headsets that provide a fully immersive experience to viewers.

Related Art

In the field of virtual reality headsets, much focus is devoted to the binocular field of view (FOV) of the user, which includes about 60° up, 50° nasally and peripherally, and 75° down. This is about 2.5 Sr. Current VR devices support most of this binocular (or "stereo") portion of the field of view, but service very little of the periphery (visible to one eye only) or the lower binocular field. To provide a fully immersive experience to viewers, large portions of the peripheral view is desirable. Human vision includes a peripheral field of view that is more than 200° horizontal and more than 115° vertical (about 5.3 Sr total). Current optical applications are unable to incorporate this peripheral field of view (FOV) in a compact, light headset that a viewer can comfortably use and move around with.

SUMMARY

In a first embodiment, a device for virtual reality imaging includes a pixel array including multiple pixels configured in a two-dimensional surface, each pixel providing multiple light beams forming an image provided to a user, and a first optical element configured to provide a central portion of a field of view for the image through an eyebox that limits a volume including a pupil of the user. The device also includes a second optical element configured to provide a peripheral portion of the field of view for the image through the eyebox, wherein the peripheral portion of the field of view comprises at least one steradian of a user's field of view at a resolution of at least fifteen arcminutes.

In a second embodiment, a display includes a pixel array configured in a two dimensional surface, wherein the pixel array includes multiple segments of active pixels separated from each other by a gap of inactive pixels, a memory storing instructions, and one or more processors configured to execute the instructions to activate each of the segments in the pixel array to emit light beams forming a portion of a peripheral field of view of an image. Each portion includes a different angle of view of the image, wherein the image is projected on a retina of a user of a head mounted display through an eyebox delimiting a position of a pupil of the user.

In a third embodiment, a method for digital calibration of a light field display includes capturing, with a camera, an image of a pixel array through a multi-lenslet array in a light field display for a head mounted display device, the image associated with a pupil location of a user of the head mounted display device. The method further includes obtaining an angular map of the pixel array from the image of the pixel array, wherein the angular map includes an angle of multiple light beams from each active pixel in the pixel array, and storing the angular map in a memory of the head mounted display device, based on the pupil location.

In a fourth embodiment, a method for aligning a head mounted display includes disposing a multi-lenslet array adjacent to a pixel array, the pixel array configured in a two-dimensional surface, each pixel providing multiple light beams to the multi-lenslet array to form an image. The method also includes rotating the multi-lenslet array about an axis perpendicular to a surface of at least one lenslet to reduce overlapping features or repeated features in the image, and translating the multi-lenslet array from its center along a plane of the multi-lenslet array to reduce overlapping features or repeated features in the image.

In yet other embodiments, a non-transitory, computer readable medium stores instructions which, when executed by a processor in a computer, cause the computer to perform a method of using a head mounted display. The method includes activating one or more pixels in a first pixel array configured to provide light beams forming a central portion of a field of view for an image provided to a user of the head mounted display. The method also includes activating at least one of multiple segments in a second pixel array configured to provide light beams forming a peripheral portion of the field of view for the image provided to the user of the head mounted display. The method also includes selecting a portion of the peripheral field of view for each of two adjacent segments in the second pixel array to form a continuous, non-overlapping image in the retina of the user through an eyebox limiting a volume that includes a location of a pupil of the user.

BRIEF DESCRIPTION OF THE DRAWINGS

FIGS. 6A-6B illustrate optical elements to provide a central portion of an FOV and a peripheral portion of the FOV for an image, according to some embodiments.

DETAILED DESCRIPTION

Figure 1A:
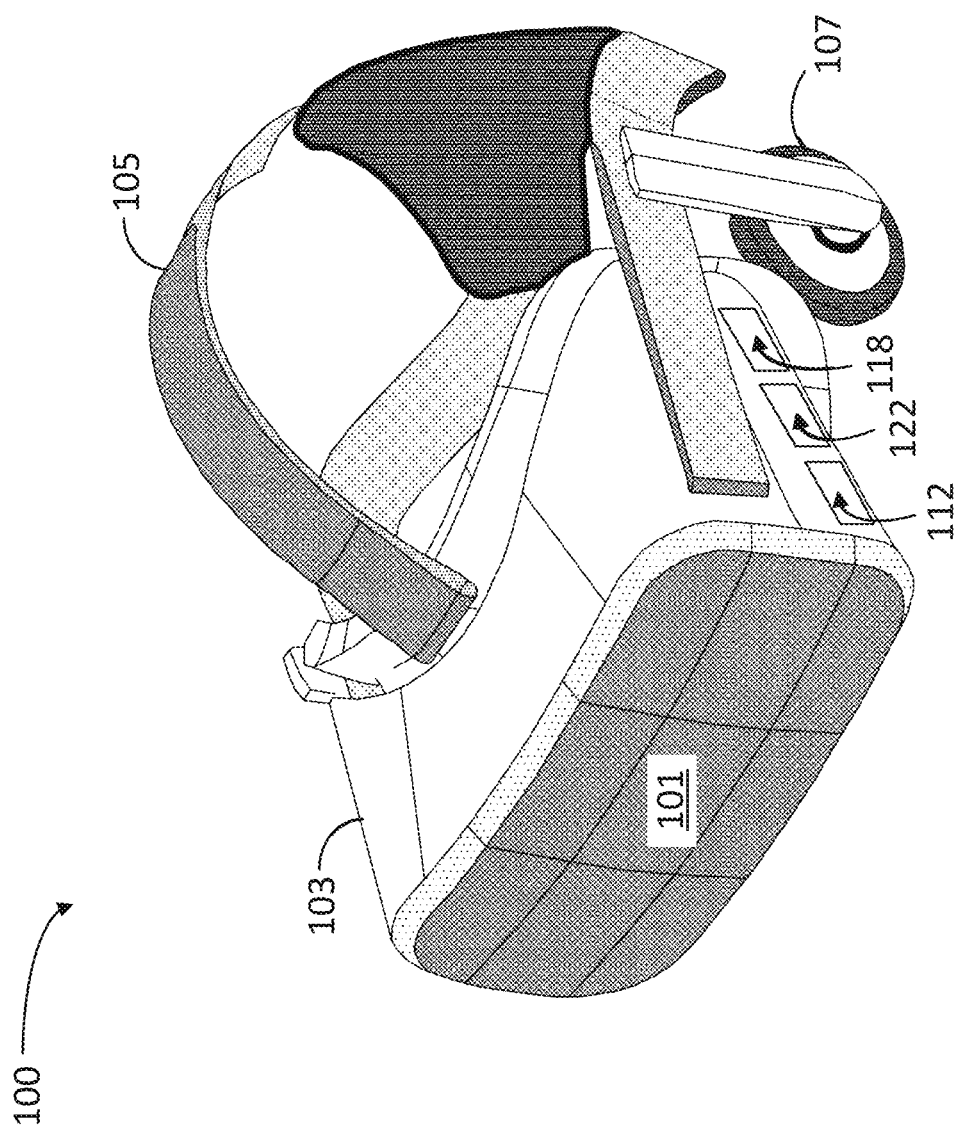
FIGS. 1A-1B illustrate an exemplary head mounted display (HMD), according to some embodiments.

Embodiments of a peripheral display are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments as disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head mounted display (HMD) connected to a host computer system, a standalone HMD, a mobile device or computing system, or any other hardware platform capable of providing artificial reality content to one or more viewers.

In some embodiments of the disclosure, "near-eye" may be defined as including an optical element that is configured to be placed within 35 mm of an eye of a user while a near-eye optical device such as an HMD (head mounted display) is being utilized.

In VR (virtual reality) displays, there are limited options for extending the field of view to cover the human visual field. Some options include filling the periphery with sparse LEDs or a bare display panel, but these both lack in resolution even compared to the low resolution of the human eye at large angles. Other approaches may include tiling (e.g., 'split lens' architectures). With enough tiles, this provides excellent coverage, but over-performs in resolution and is bulky.

Light field displays are compact and provide a generous eyebox and FOV, while potentially trading away resolution. In this disclosure, some embodiments include a flat peripheral light field display with a freeform lenslet tailored to match the needs of the periphery. Some embodiments include a curved peripheral light field display with a freeform lenslet and conical display that wrap around the central optic, from the outer brow to the lower cheek of the viewer. This single display fills the entire (or substantially the entire) peripheral FOV.

FIG. 1A illustrates an exemplary HMD 100, according to some embodiments. For example, HMD 100 may be a virtual reality (VR) HMD. HMD 100 includes a front panel 101, a visor 103, and a strap 105. Front panel 101 includes and protects a display for the user, visor 103 adjusts HMD 100 on the user, and strap 105 keeps HMD 100 tightly fit on the user's head. An audio device 107 provides sound to the user.

In some embodiments, HMD 100 may include a processor circuit 112 and a memory circuit 122. Memory circuit 122 may store instructions which, when executed by processor circuit 112, cause HMD 100 to execute a method as disclosed herein. In addition, HMD 100 may include a communications module 118. Communications module 118 may include radio-frequency software and hardware configured to wirelessly communicate processor 112 and memory 122 with an external network, or some other device. Accordingly, communications module 118 may include radio antennas, transceivers, and sensors, and also digital processing circuits for signal processing according to any one of multiple wireless protocols such as Wi-Fi, Bluetooth, Near field contact (NFC), and the like. In addition, communications module 118 may also communicate with other input tools and accessories cooperating with HMD 100 (e.g., handle sticks, joysticks, mouse, wireless pointers, and the like).

Figure 1B:
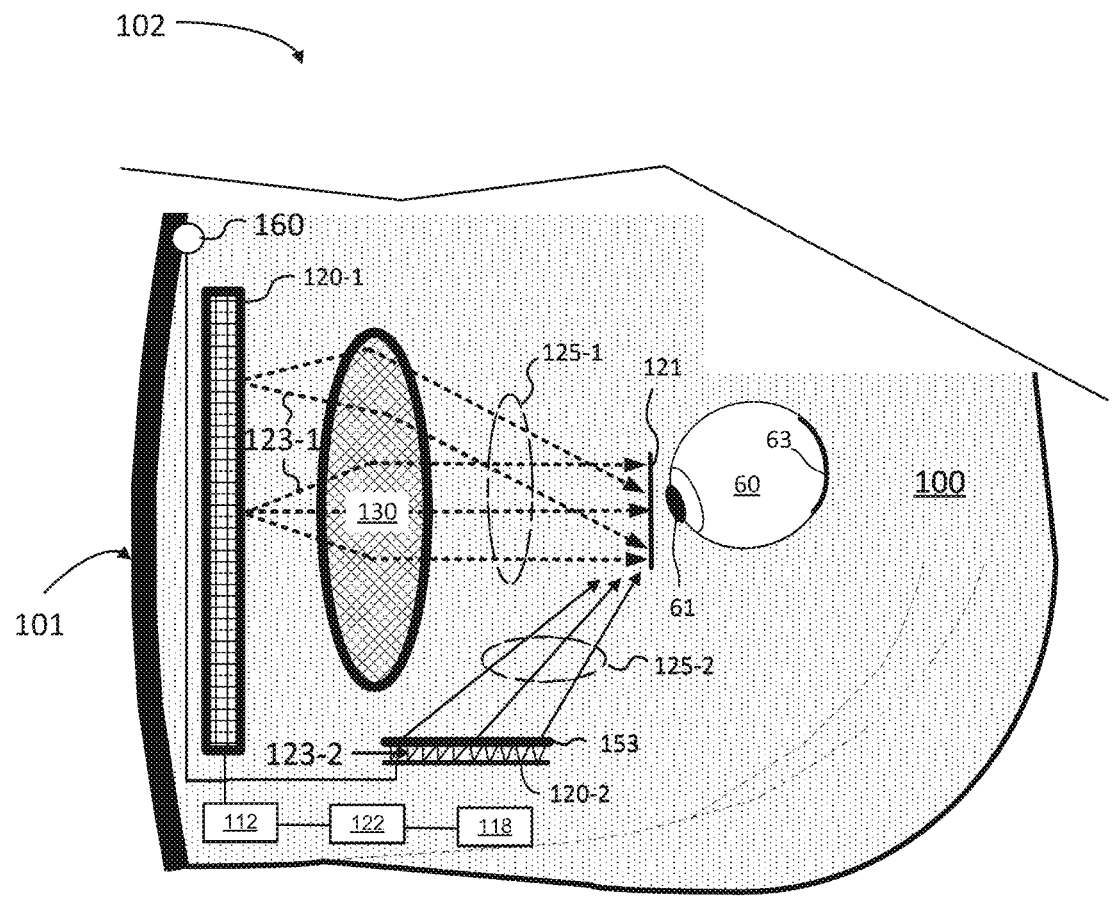

FIG. 1B illustrates a partial view of a left side view 102 of HMD 100 corresponding to the left eye 60 of a user. HMD 100 may include two mirror images of left side view 102 each having the same or similar elements as illustrated in left side view 102. The choice of the left side in FIG. 1B is arbitrary, and all components therein may be present in the right side of HMD 100. HMD 100 includes a pixel array 120-1 and a pixel array 120-2 (hereinafter, collectively referred to as "pixel arrays 120"). Pixel arrays 120 include multiple pixels configured in a two-dimensional surface (e.g., a flat surface oriented in one direction as in pixel array 120-1, and one or two flat surfaces oriented in a different direction as in pixel array 120-2). Each pixel in pixel arrays 120 provides multiple light beams 123-1 and 123-2 (hereinafter, collectively referred to as "display light beams 123") forming an image provided to a user. An optical element 130 is configured to provide a central portion of an FOV for the image through an eyebox 121. The central portion of the FOV for the image may include light beams 125-1. An optical element 153 provides a peripheral portion of the FOV for the image through eyebox 121 including light beams 125-2. Light beams 125-1 and 125-2 will be collectively referred to, hereinafter, as "eyebox light beams 125." Eye 60 includes a pupil 61, to accept at least some of eyebox light beams 125, and a retina 63, where the image is projected.

In some embodiments, optical elements 130 and 153 may include one or more optical elements such as diffractive elements (gratings and prisms), refractive elements (lenses), guiding elements (e.g., planar waveguides and/or fibers), and polarizing elements (e.g., polarizers, half-wave plates, quarter wave-plates, polarization rotators, Pancharatnam-Berry Phase lens—PBP—, and the like). In some embodiments, optical elements 130 and 153 may include one or more passive elements combined with one or more active elements, such as a liquid crystal (LC) variable wave plate or variable polarize.

In some embodiments, pixel array 120-2 may be divided into active pixel segments, and optical element 153 may include a multi-lenslet array wherein each lenslet directs light beams 123-2 from at least one pixel segment into eyebox 121. In some embodiments, optical element 153 may include a freeform multi-lenslet array. Accordingly, light beams 125-2 provide a segmented view of the peripheral FOV that forms a continuous projection of the periphery of the image on retina 63 through eyebox 121 and pupil 61 by overlapping FOV frustums from different active pixel segments. In some embodiments, processor 112 activates each of the segments in pixel array 120-2 to emit light beams 123-2 forming a portion of a peripheral FOV. Each portion of the peripheral FOV from each segment may include a different angle of view of the image.

In some embodiments, HMD 100 includes one or more sensors 160 to determine a position of pupil 61 within eyebox 121. Sensor 160 then sends the information about the position of pupil 61 within eyebox 121 to processor 112. Accordingly, processor 112 may determine a gaze direction of the user, based on the position of pupil 61 within eyebox 121. In some embodiments, memory 122 includes instructions for processor 112 to select the peripheral field of view of the image based on a gaze direction of the viewer and the position of pupil 61 within eyebox 121. In some embodiments, memory 122 contains display calibration instructions which change how the virtual image is mapped to pixel arrays 120 based on pupil location and/or gaze direction.

Figure 2A:
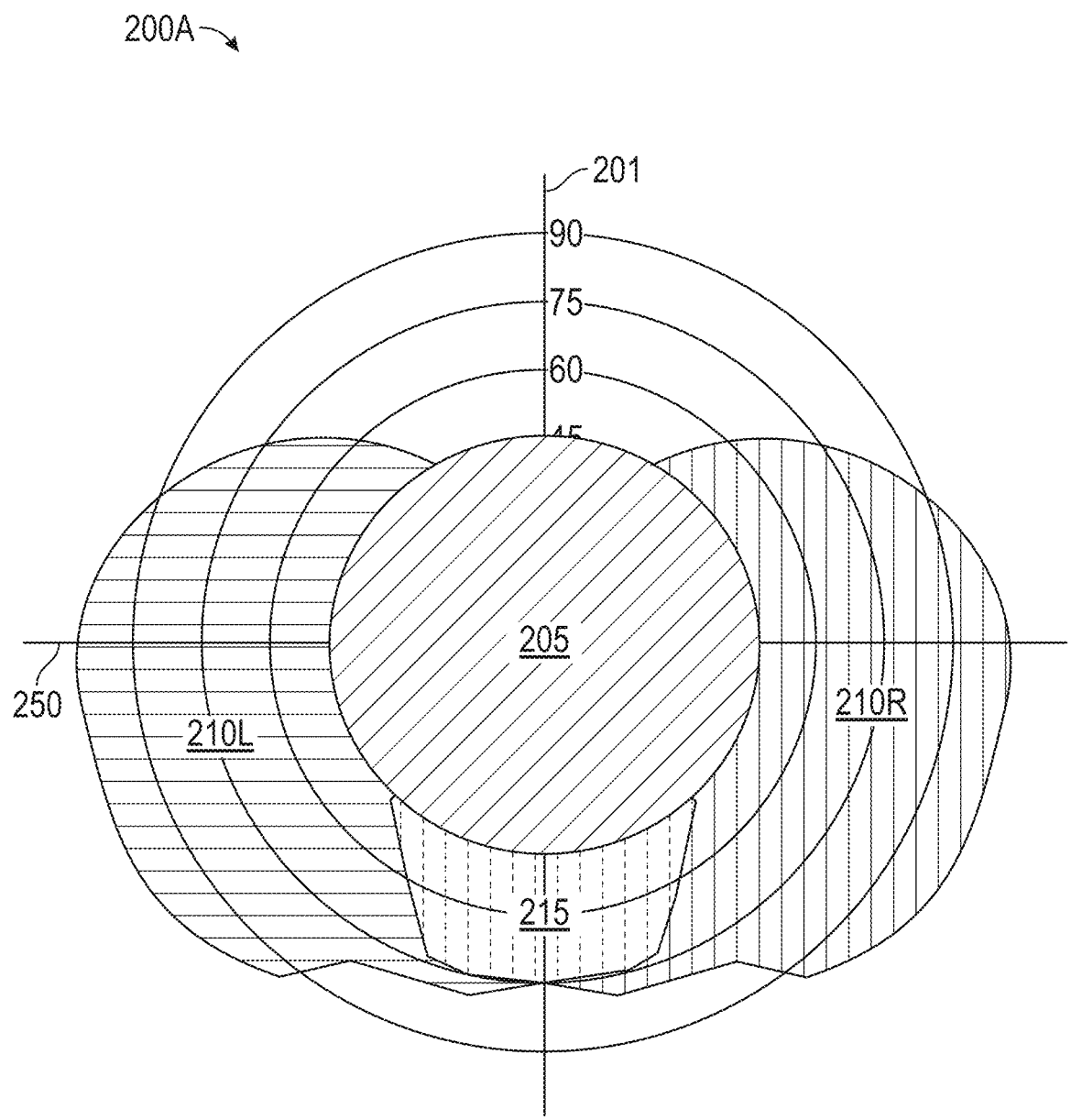
FIGS. 2A-2C illustrate a FOV of human vision including a central portion, a peripheral left portion, and a peripheral right portion, according to some embodiments.
Figure 2B:
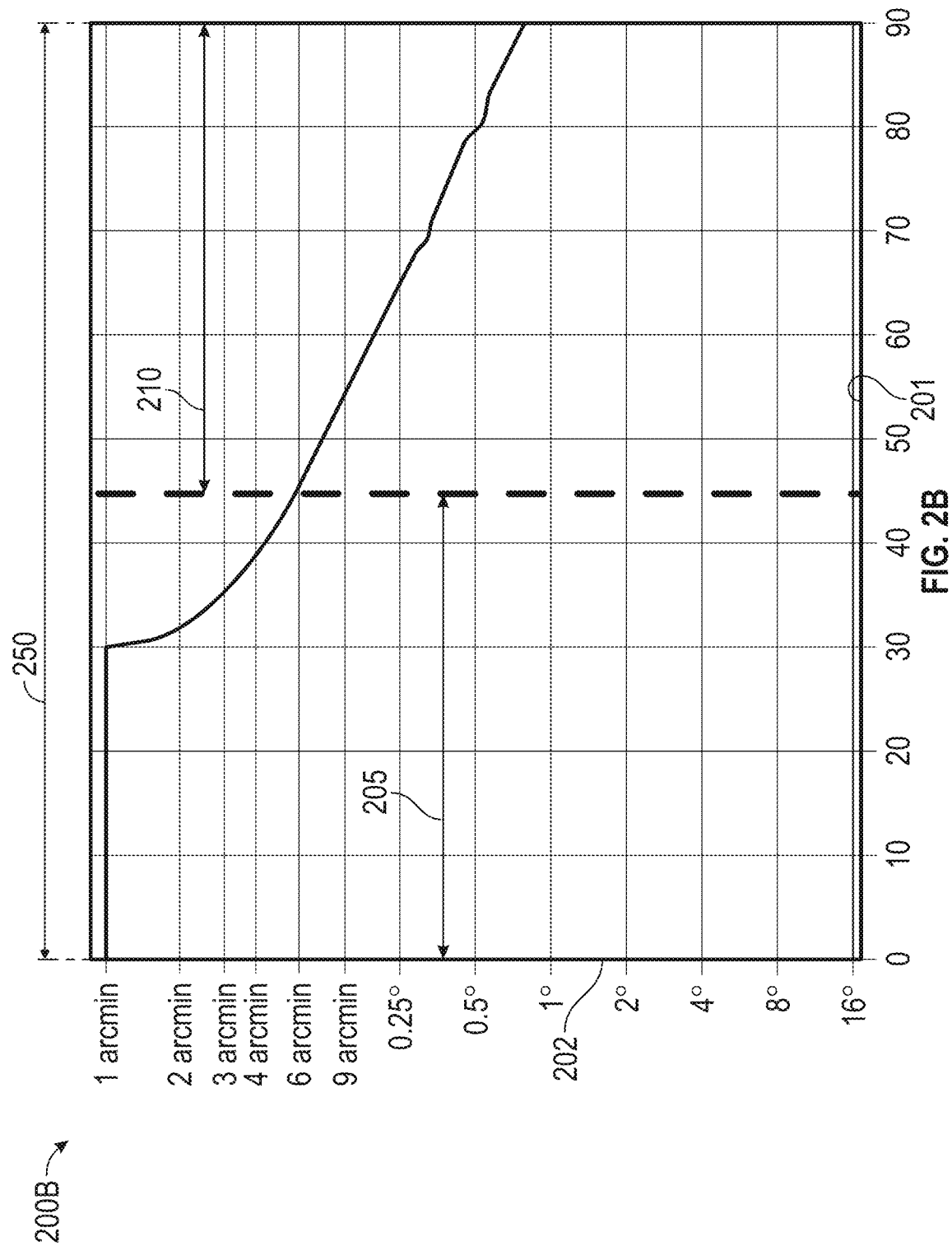
Figure 2C:
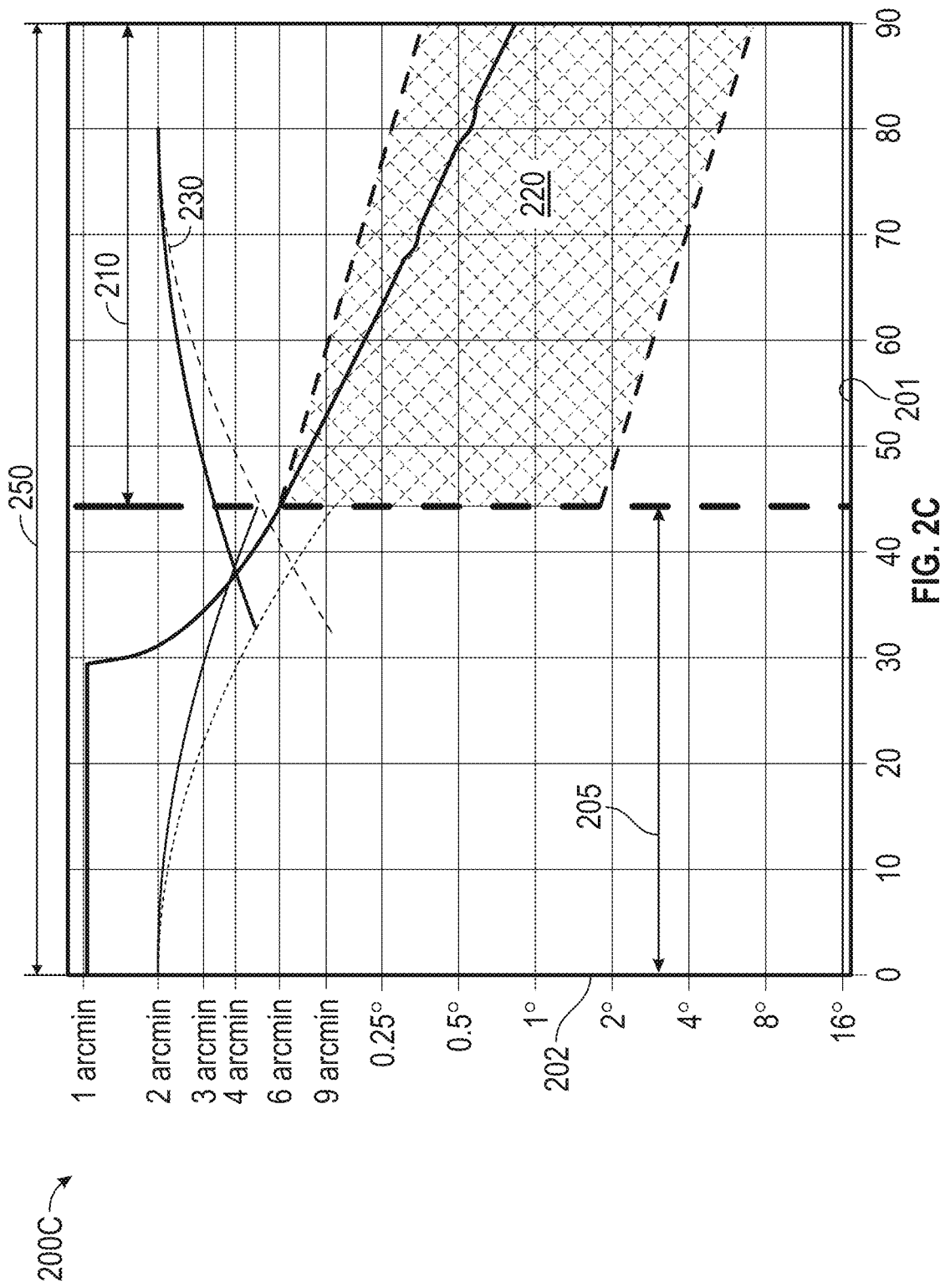

FIGS. 2A-2C illustrate charts 200A, 200B, and 200C for a field of view (FOV) 250 of human vision. FOV 250 includes a central portion 205, a peripheral left portion 210L, and a peripheral right portion 210R (hereinafter, collectively referred to as peripheral portions 210), according to some embodiments, measured according to an angular aperture 201. Angular aperture 201 is measured azimuthally relative to a direction pointing normal to and straight out of the face of the user (which corresponds to 0°).

FIG. 2A illustrates chart 200A with a left eye portion 210L and a right eye portion 210R as a function of angular aperture 201 (in degrees). This represents the human visual field without eye rotation. Peripheral portions 210 may have some overlap in a binocular portion 215, included within the lower peripheral FOV. Central portion 205 includes the combined FOV from both eyes, within a 45° angle from the normal, that is, central portion 205 includes a binocular FOV. According to chart 200A, peripheral portions 210 may include about 60% of total FOV 250.

FIG. 2B illustrates an approximated performance chart 200B of human vision for the entire FOV 250, wherein the abscissae (e.g., the X-axis) indicates angular aperture 201, and the ordinates (e.g., the Y-axis) indicate an angular resolution 202, expressed in arc minutes (arcmins). Performance chart 200B assumes that the eye rotates up to 30° away from center in casual scenarios. Thus, 1 arcmin "foveal" resolution is maintained up to 30° radially and the human eye performance decreases steadily beyond 30° down to about 1 degree resolution at 90° angular aperture (e.g., near the edge of FOV 250). The human eye performance within central portion 205 may drop to as low as about 6 arcmins at the edges.

FIG. 2C illustrates a performance chart 200C for different optical configurations of an HMD, compared with the human performance. As in chart 200B, angular resolution 202 is plotted against angular aperture 201. A split lens configuration 230 captures peripheral portions 210 at a relatively high resolution. The dashed lines indicate a design-based performance range of the split lens. The tradeoff of split lens configuration 230 is the form factor for HMD applications (including the weight of the lenses uses, and the like).

A light field display configuration 220 is able to keep on par with the regular eye vision performance for approximately the entire span of peripheral portions 210. In some embodiments, the resolution of light field configuration 220 may be limited by the number of pixels per inch (PPI) in the pixel array (e.g., pixel arrays 120), and also by the focal length of a lenslet in the multi-lenslet array (e.g., optical element 153).

Figure 3:
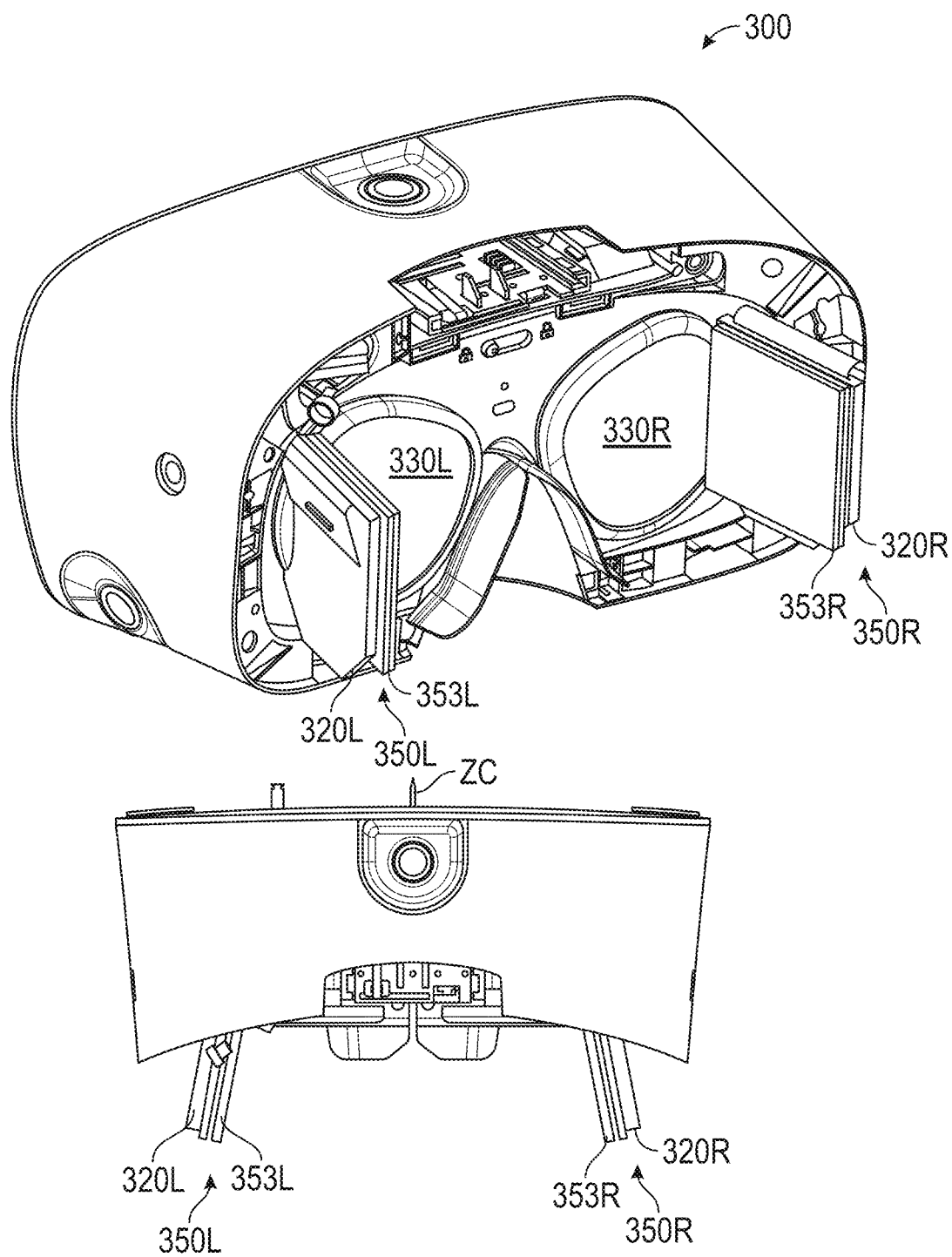
FIG. 3 illustrates an HMD having peripheral light field displays to provide a peripheral FOV to a user, according to some embodiments.

FIG. 3 illustrates an HMD 300 having peripheral light field displays 350L and 350R (collectively referred to as "light field displays 350"). In some embodiments, light field displays include lenslet arrays with micro-lenses having dimensions of approximately 1 mm to provide accommodation focus for a user viewing the display. In some embodiments, a light field display described in this disclosure may include lenslet arrays having micro-lenses with dimensions of approximately 3-6 mm that may not necessarily provide accommodation focus to the eye.

Light field display 350L includes a pixel array 320L and a lenslet array 353L to provide peripheral display light emitted by pixel array 320L to the peripheral FOV of a left eye of a user. Light field display 350R includes a pixel array 320R and a lenslet array 353R to provide peripheral display light emitted by pixel array 320R to the peripheral FOV of a right eye of the user of HMD 300. Pixel arrays 320L and 320R (collectively referred to as pixel arrays 320) may be OLED displays or LCDs, for example. Lenslet arrays 353L and 353R (collectively referred to as lenslet arrays 353) may be flat lenslet arrays configured with square tessellation, hexagonal tessellation, and/or hexapolar tessellation. An advantage of hexapolar tessellation is that the number of unique prescriptions can be reduced due to rotational symmetry (e.g., a lenslet with 9 rows only requires 9 unique prescriptions). A primary display of HMD 300 (not illustrated) is disposed behind central optics 330L and 330R.

FIGS. 4A-4D illustrate block diagrams of a first pixel array 420-1 and a second pixel array 420-2 (hereinafter, collectively referred to as "pixel arrays 420") providing a central portion and a peripheral portion of an FOV through an eyebox 421 in an HMD, according to some embodiments.

A first optical element 430 and a lenslet array 453 direct light beams 423-1 and 423-2 (hereinafter, collectively referred to as "display light beams 423") into light beams 425-1 and 425-2 (hereinafter, collectively referred to as "display light beams 425") through eyebox 421. In some embodiments, optical element 453 and pixel arrays 420 form a light field display 450. In light field display 450, pixel array 420-2 may be divided into pixel segments, and each lenslet in lenslet array 453 directs light beams 423-2 from at least one pixel segment in pixel array 420 into eyebox 421. In some embodiments, lenslet array 453 may have one or more optically powered surfaces (e.g., curved surfaces or otherwise refractive surfaces causing deflection of light beams traversing the surface at an angle different from a normal to the surface) on each side of a substrate. In some embodiments, lenslet array 453 includes two powered surfaces. In some embodiments, lenslet array 453 includes a stack of multiple lenslet arrays which work in series.

Figure 4A:
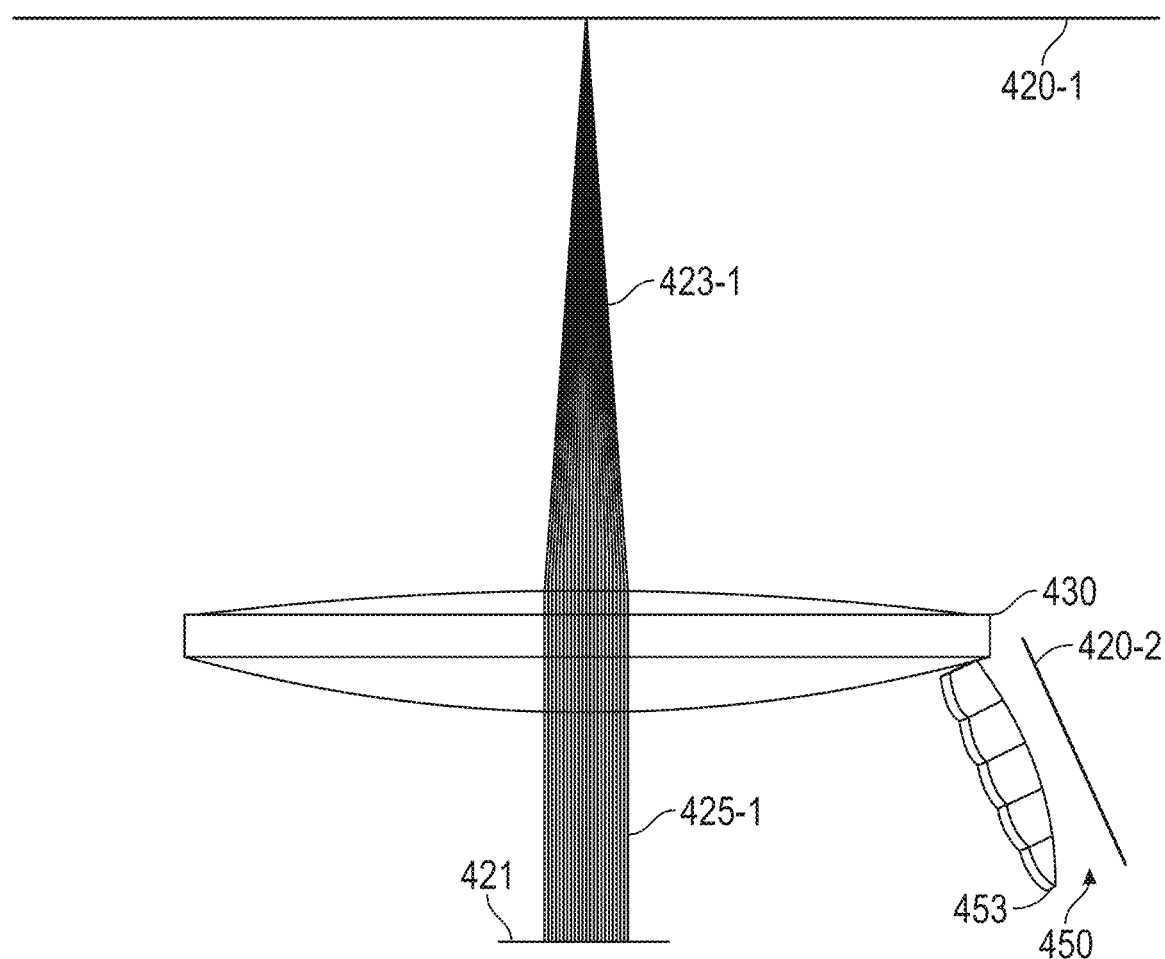
FIGS. 4A-4D illustrate block diagrams of a primary display and a secondary display providing a binocular portion and a peripheral portion of a field of view through an eyebox in an HMD, according to some embodiments.

FIG. 4A illustrates a functional block diagram 400A of pixel array 420-1 providing display light beams 423A for a central portion of an FOV for an image through eyebox 421. Central optic 430 is configured to direct display light beams 423A to eyebox light beams 425A.

Figure 4B:
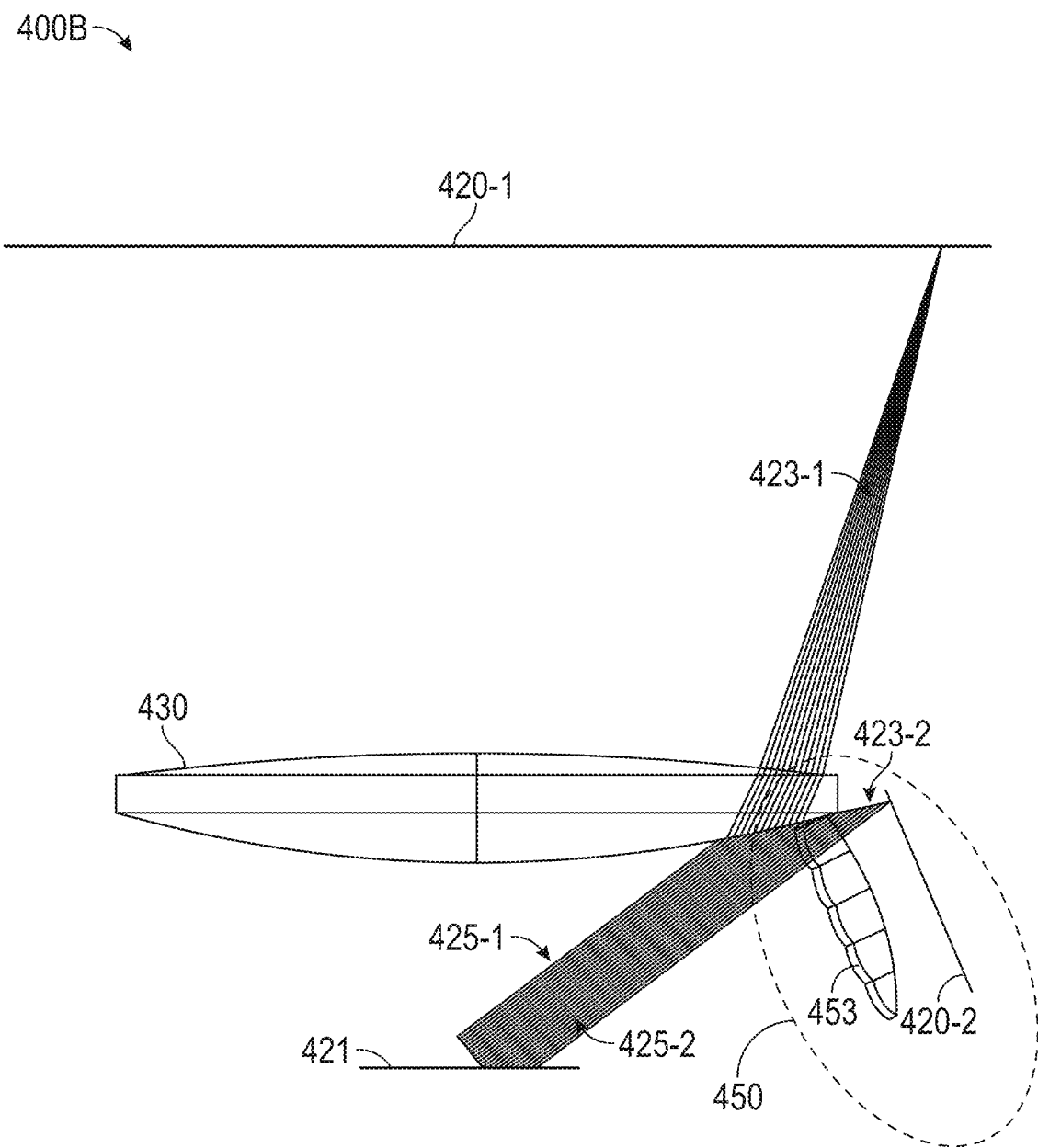

FIG. 4B illustrates a functional block diagram 400B wherein pixel array 420-1 generates a light beam 423B from a different portion of a central FOV. Optical element 430 deflects light beam 423B into light beam 425B through eyebox 421. In addition, pixel array 420-2 generates a light beam 423C that is directed by lenslet array 453 to eyebox light beam 425C through eyebox 421. Note how eyebox beam 425C provides to eyebox 421 a peripheral portion of the FOV, which is in general different from the central portion of the FOV.

Figure 4C:
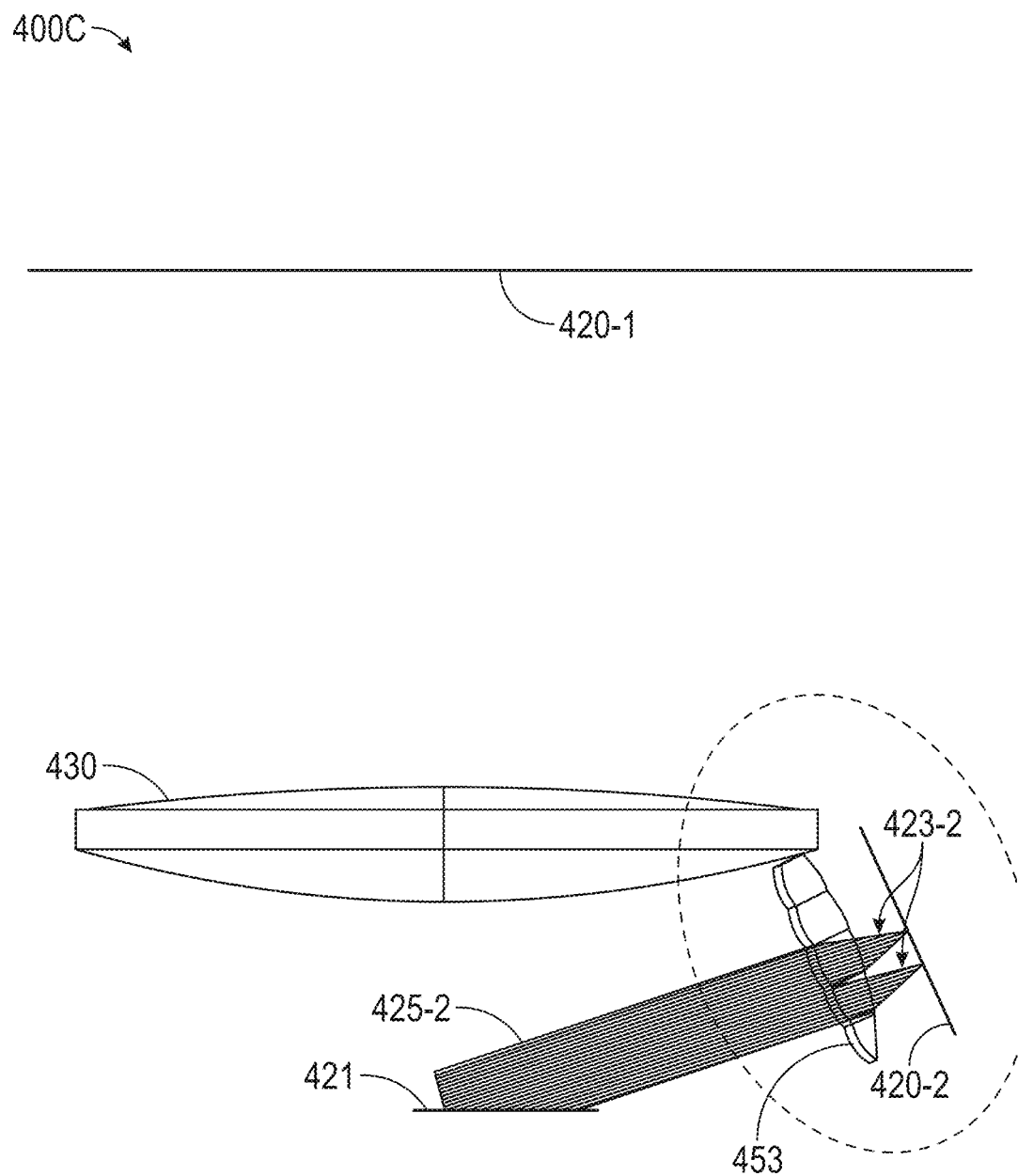

FIG. 4C illustrates a functional block diagram 400C wherein pixel array 420-2 generates multiple light beams 423-2 for different segments of the peripheral portion of the FOV. Accordingly, lenslet array 453 directs eyebox light beams 425-2 through eyebox 421.

Figure 4D:
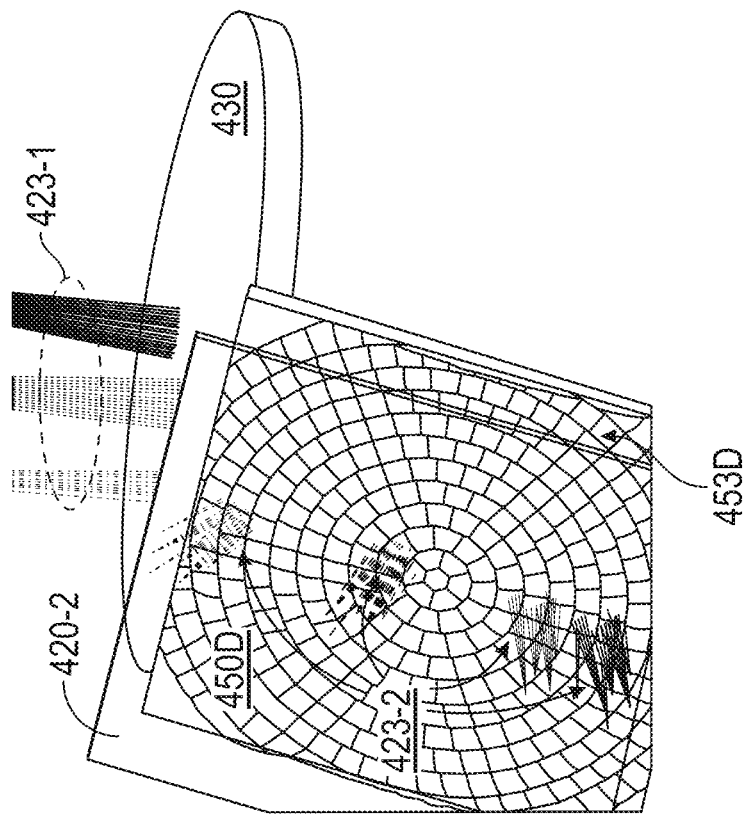
Figure 4D:
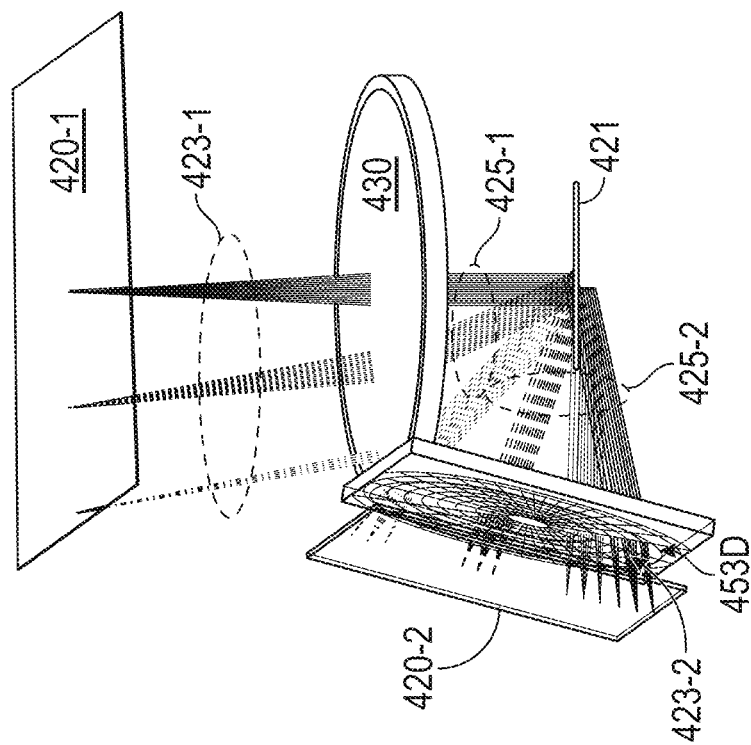

FIG. 4D illustrates a lenslet array 453D that includes a hexapolar tessellation configuration. Accordingly, a pixel array 420-1 provides light beams 423-1 that are directed by optical element 430 (e.g., a lens, a waveguide, a diffractive element, or any combination thereof) to light beams 425-1 into eyebox 421. Lenslet array 423D receives light beams 423-2 from pixel array 420-2 and directs light beams 425-2 into eyebox 421. Consistent with the present disclosure, light beams 423-1 and 425-1 include a central portion of the FOV, and light beams 423-2 and 425-2 include a peripheral portion of the FOV. Accordingly, pixel array 420-2 and lenslet 453D may be part of a light field display 450D.

Figure 5:
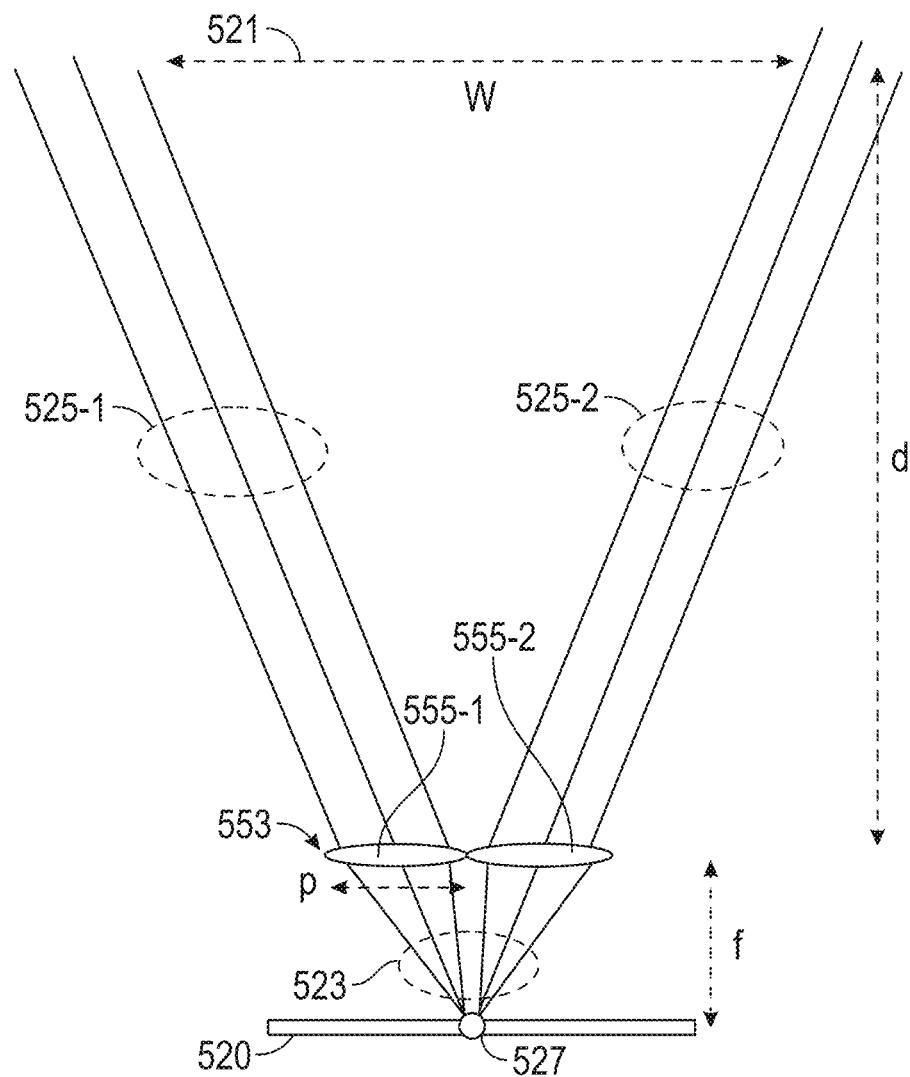
FIG. 5 illustrates a ray tracing configuration for a multi-lenslet array directing light beams from a light field display through an eyebox in an HMD to avoid overlap of multiple FOVs, according to some embodiments.

FIG. 5 illustrates a first-order approximation of a size of eyebox 521 that can be supported without cross-talk, according to some embodiments. Cross-talk is defined as light from a pixel 527 in a pixel array 520 reaching eyebox 521 from two different angles. In this figure, a pixel 527 emits light rays 523 which intercept two adjacent lenslet elements 555-1 and 555-2. Two corresponding light ray bundles 525-1 and 525-2 propagate toward eyebox but just miss on either side. Thus, embodiments as disclosed herein avoid a cross-talk condition when eyebox 521 is narrower than W, is avoided. Multi-lenslet array 553 includes adjacent lenslets 555-1 and 555-2 (hereinafter, collectively referred to as "adjacent lenslets 555") separated by a pitch, 'p', and is disposed at a focal distance, 'f', from pixel array 520. Eyebox 521 has a width, 'W', and is located at a distance 'd', from multi-lenslet array 553.

Accordingly, display light beams 523 coming from a single source in pixel array 520 are separated by two adjacent lenslets 555 such that eyebox beams 525-1 and 525-2 both miss eyebox 521 provided the values of f, p, d, and W satisfy the following equation:

$$W \leq p\, d/f \quad (1)$$

Figure 6A:
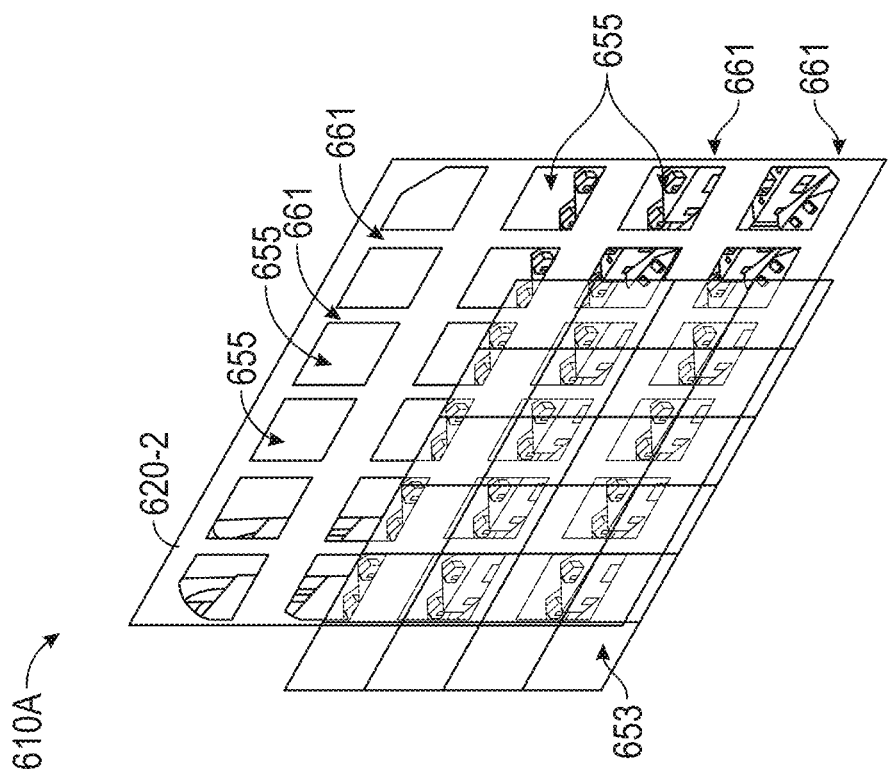
Figure 6A:
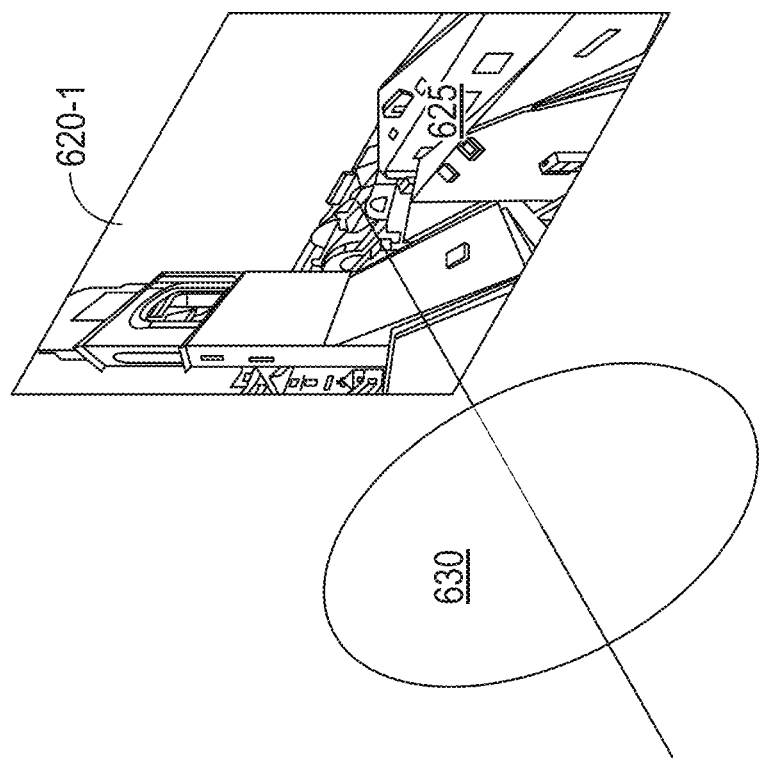

FIGS. 6A-6B illustrate optical elements 630 and 653 to provide a central portion of an FOV and peripheral portions 610A and 610B of the FOV for an image (hereinafter, collectively referred to as peripheral portions 610), respectively, according to some embodiments. The image is provided by pixel arrays 620-1, 620-2, and 620B (hereinafter, collectively referred to as "pixel arrays 620"). Pixel array 620-2 may selectively use multiple segments 655 of active pixels, separated by gaps 661 of inactive pixels. The thickness and shape of segments 655 and gaps 661 depends on design considerations as will be discussed below. In some embodiments, gaps 661 may be thin lines, or even have zero thickness so that segments 655 may be continuous with one another. Each of segments 655 may display different portions of the peripheral FOV, as they will be projected by optical element 653 through an eyebox at a selected angle. In some embodiments, segments 655 of active pixels and gaps 661 are selected according to a given pupil location. Accordingly, for different pupil positions the 'on' regions can move around on the display.

FIG. 6A illustrates optical element 630 to provide a central portion 625 of an FOV and optical element 653 to provide a peripheral portion 610A of the FOV, according to some embodiments. In some embodiments, a processor (e.g., processor 112), executes instructions to select a segment of a peripheral portion of the FOV from each of two adjacent segments 655 to form a continuous, seamless peripheral image 610A in the retina of the user, through the eyebox.

FIG. 6B illustrates pixel array 620B separated into segments 655 to provide peripheral portion 610B to the user of an HMD, according to embodiments disclosed herein. Peripheral portion 610B is captured with a camera through the lenslet array 553, for illustrative purposes. Accordingly, each of segments 655 includes a different view of peripheral portion 610B. Segments 655 may include partially overlapping, segmented views of peripheral portion 610B. When light from each of segments 655 is collected via an optical element as disclosed herein (e.g., optical element 153, 553, or multi-lenslet array 453) and sent through an eyebox in the HMD, a continuous view of peripheral portion 610B is projected on the user's retina. In some embodiments, gaps 661 are selected together with the optical element so as to avoid the repeated segments of peripheral portion 610B from adjacent segments to go through the eyebox. In some embodiments, the optical power and position of the optical element used may be such that gaps 661 are very thin, or have zero thickness, so that adjacent segments 655 continuously transition from one to the other.

Figure 7A:
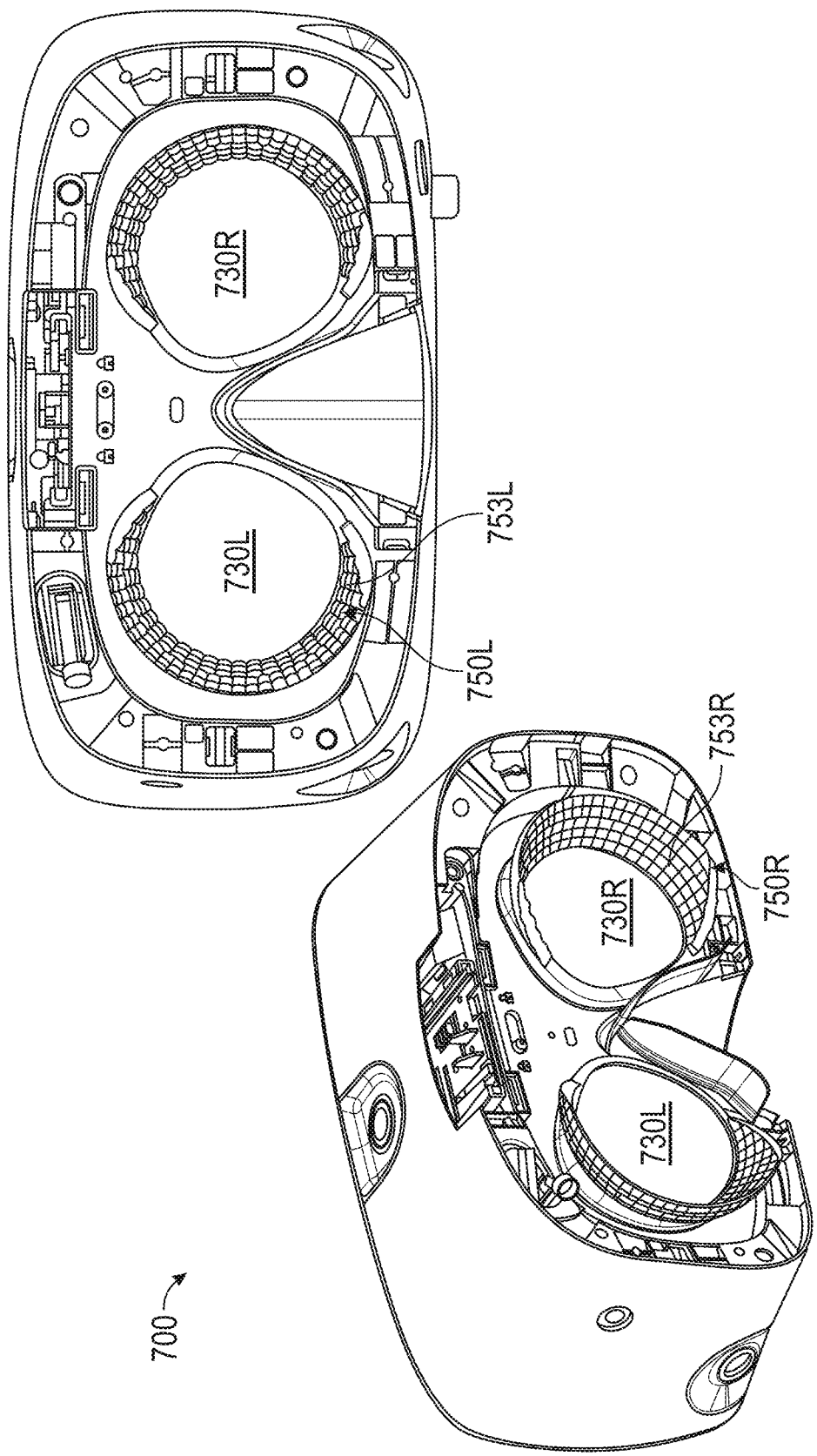
FIGS. 7A-7C illustrate partial views and components of an HMD having a multi-lenslet array to collect light from a peripheral light field display configured in a conical shape to provide a peripheral FOV to a user, according to some embodiments.
Figure 7B:
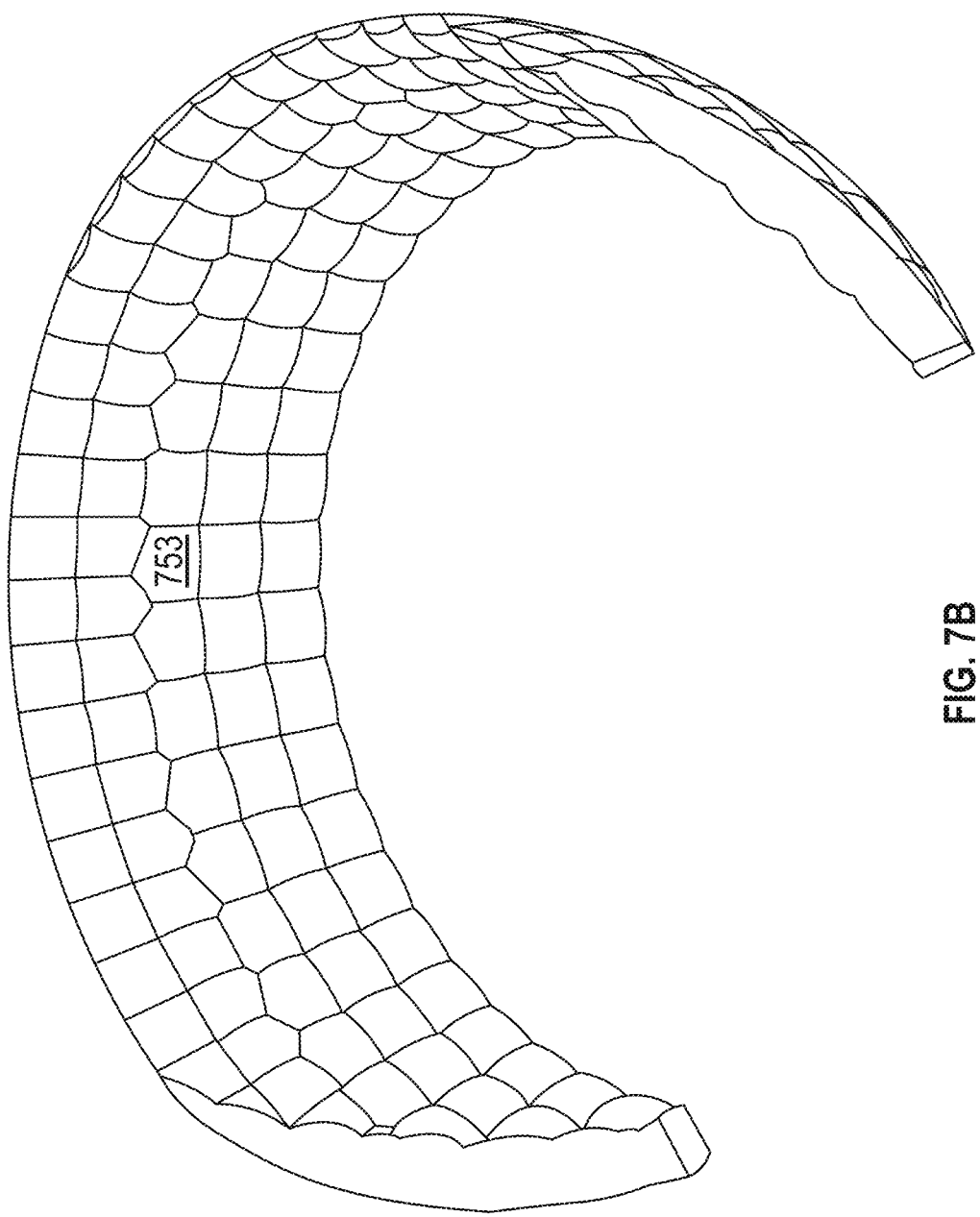
Figure 7C:
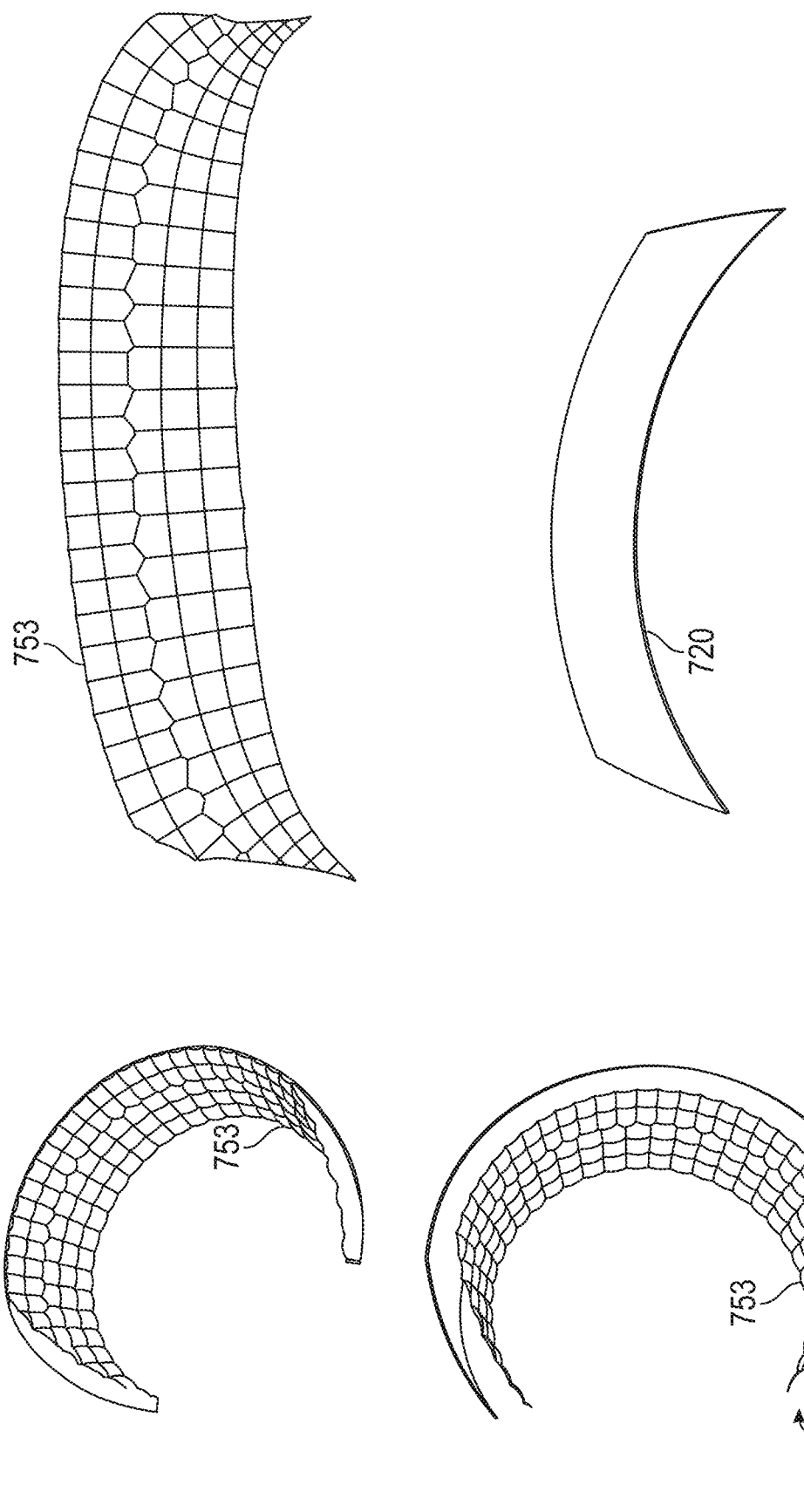

FIGS. 7A-7C illustrate partial views and components of an HMD having a multi-lenslet array 753 to collect light from a peripheral light field display configured in a conical shape to provide a peripheral FOV to a user, according to some embodiments.

FIG. 7A illustrates an HMD 700 having curved peripheral light field displays 750L and 750R (collectively referred to as light field displays 750). Curved peripheral light field displays 750 may be configured in a conical shape wrapped around a central display configured to provide a central portion of the FOV or an image, to the user of HMD 700.

The central display includes central optical elements 730L and 730R (hereinafter, collectively referred to as "central optical elements 730"). Light field display 750L includes a curved display disposed behind the illustrated lenslet array 753L to provide peripheral display light to the peripheral FOV to a left eye of a user. Light field display 750R includes a curved display disposed behind the illustrated lenslet array 753R to provide peripheral display light to the peripheral FOV of a right eye of a user. Lenslet arrays 753L and 753R will be collectively referred to as lenslet arrays 753. A primary display of HMD 700 (not illustrated) is disposed behind central optics 730L and 730R. Lenslet arrays 753 may be conical lenslet arrays that wrap around central optical elements 730 to provide a peripheral portion of the FOV for the image.

Curved light field displays 750 may be configured to wrap from the brow area of a user around the eye down to the cheek area to provide peripheral display light to the user of HMD 700. Curved light field displays 750 may be wrapped around a central optic (e.g., central optic 730).

FIG. 7B illustrates an example curved lenslet array 753 for a curved light field display. Lenslet array 753 is a curved lenslet array that may be configured with square tessellation, hexagonal tessellation, and/or hexapolar tessellation. More generally, any tessellation which can avail itself to symmetry reduces the number of unique prescriptions for different applications. In some embodiments, a hexapolar-like tessellation with a number of elements growing monotonically in rows away from the central optic only requires as many unique prescriptions as the number of rows.

FIG. 7C illustrates an example curved light field display 750 having a pixel array 720 paired with curved lenslet array 753. Pixel array 720 forms a two-dimensional surface that follows a one-dimensional curvature. More specifically, pixel array 720 is configured in a conical surface that wraps around central optical elements 830. Pixel array 720 and curved lenslet array 753 may have conical symmetry. More generally, pixel array 720 and curved lenslet array 753 may be wrapped around a same azimuth.

A configuration of peripheral light field display 750 that is advantageous for manufacturing pixel array 720 may include one of a flexible organic light emitting diode (OLED) array, a flexible liquid crystal (LC) display, or a light emitting diode (LED) array. Lenslet array 753 may also be fabricated on a planar flexible optical substrate and then be rolled into a curved (e.g., conical) shape to be paired with display 750.

For either the flat light field display embodiments (e.g., light field display 450) or the curved light field display embodiments (e.g., light field display 750) in this disclosure, more than two powered surfaces may be included in the lenslet arrays (e.g., lenslet arrays 453 or 753). For example, a stacked lenslet array may include two substrates stacked together to provide three or four optically powered (e.g., refractive) surfaces.

Figure 8A:
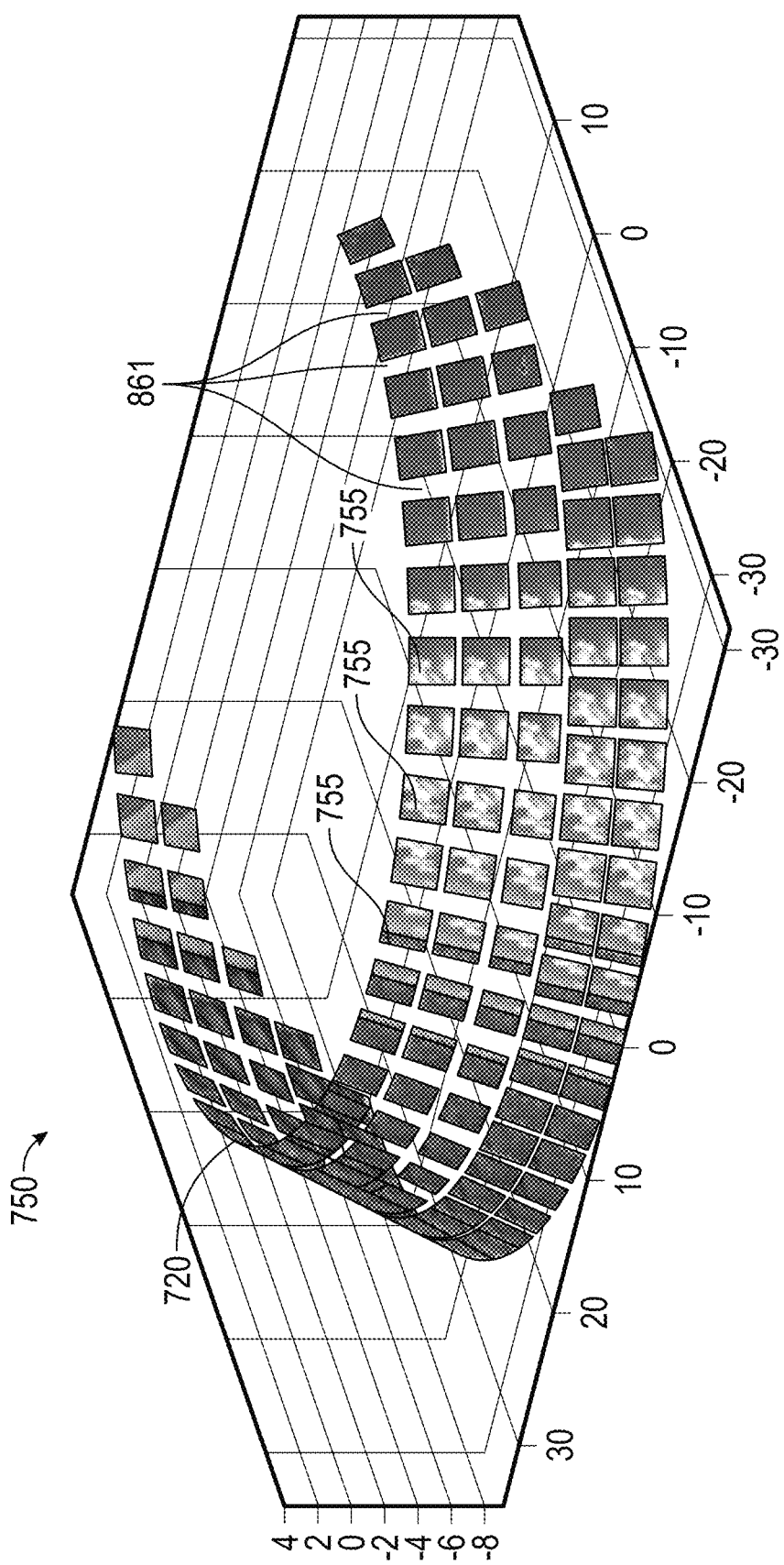
FIGS. 8A-8B illustrate partial views of the light field display for the HMD of FIGS. 7A-7C, according to some embodiments.
Figure 8B:
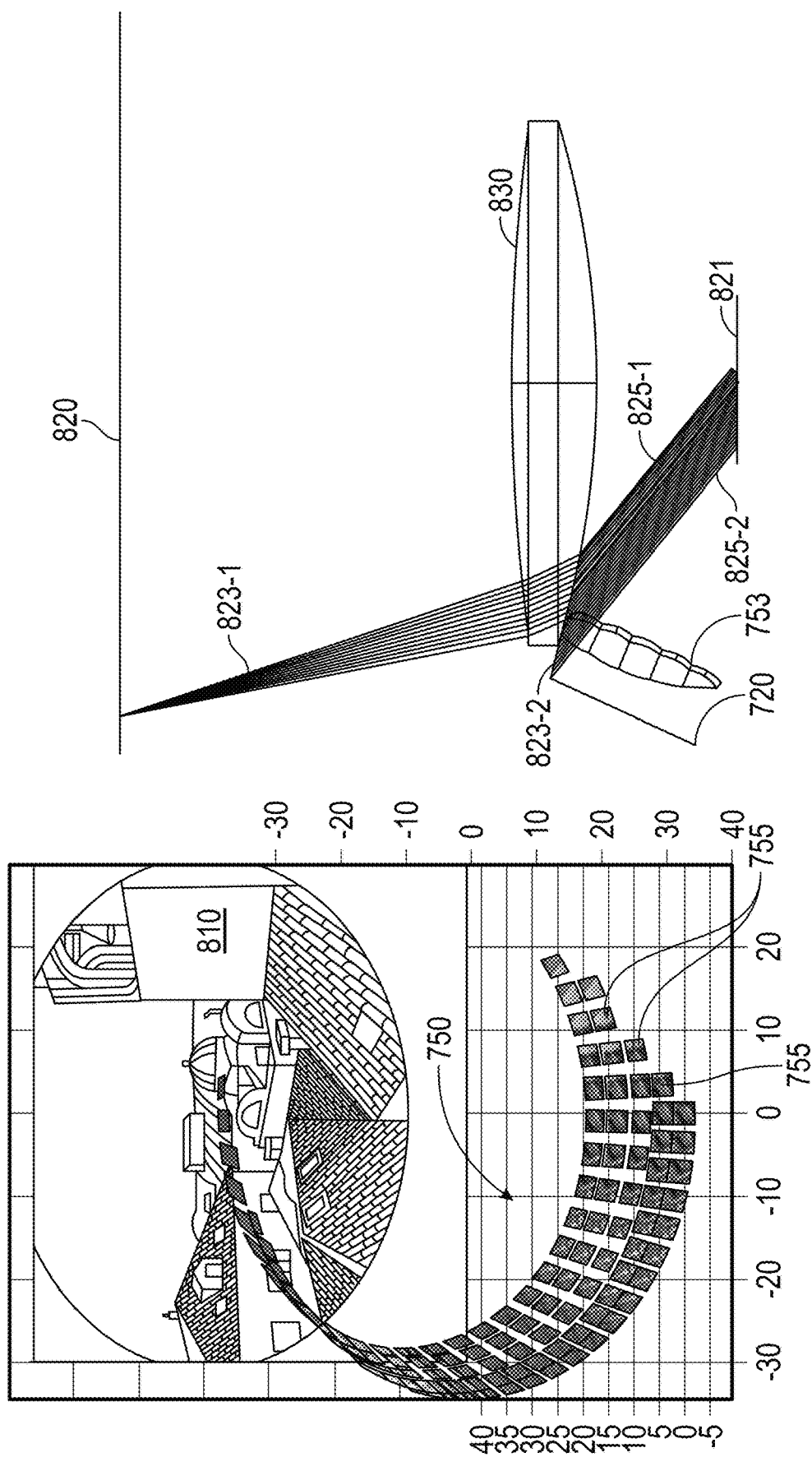

FIGS. 8A-8B illustrate partial views of pixel array 720 in light field display 750, according to some embodiments. Pixel array 720 is partitioned into segments 755, separated from each other by gaps 861.

FIG. 8A illustrates light filed display 750 within a three-dimensional Cartesian frame to show the conical shape of the surface formed by segments 755.

FIG. 8B illustrates peripheral portion 810 of the FOV from the image that is provided by light field display 750. Also shown is a top down view of pixel arrays 720 and 820, central optical element 830, and multi-lenslet array 753. Pixel array 720 may include a flat pixel array. Central optical element 830 receives light beams 823-1 from pixel array 820 and provides light beams 825-1 to an eyebox 821. Multi-lenslet array 753 receives light beams 823-2 from pixel array 820 and provides light beams 825-2 to eyebox 821. Light beams 825-2 include light beams from at least one of segments 755, and carry a partial view of peripheral portion 810.

Figure 9:
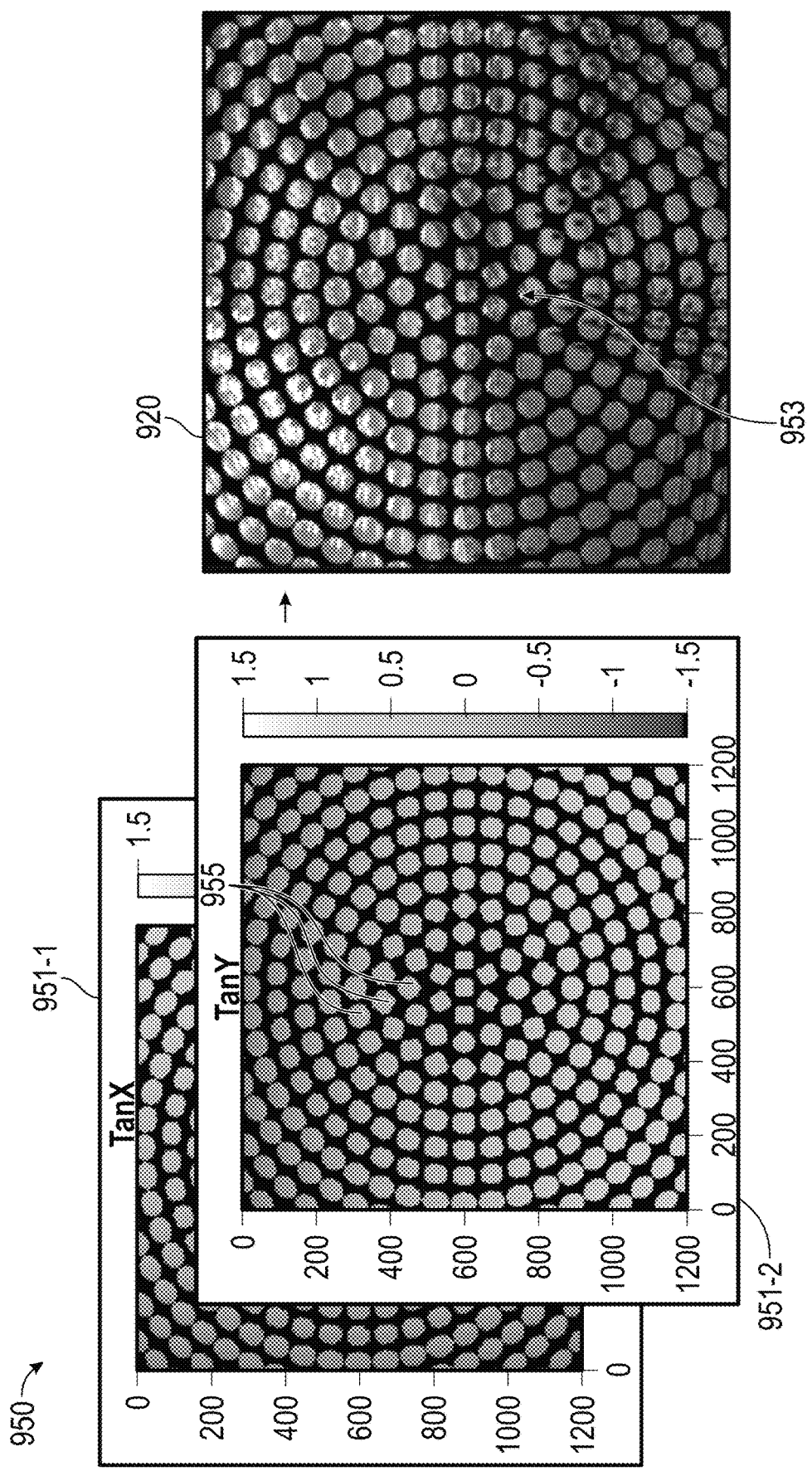
FIG. 9 illustrates an angular map of a light field display configured in a hexapolar array of pixel segments, according to some embodiments.

FIG. 9 illustrates angular maps 951-1 and 951-2 (hereinafter, collectively referred to as "angular maps 951") of a light field display 950 configured in a hexapolar array 920 of active pixel segments 955, according to some embodiments. In some embodiments, hexapolar array 920 is matched with a multi-lenslet array 953 having a hexapolar symmetry (cf. lenslet array 453D).

Angular maps 951 include a color scale to indicate the angular correspondence of a pixel into in the X and Y angle directions of a virtual scene. The dark areas, or gaps, represent inactive pixels that have no mapping to the eyebox. As the eye pupil moves, angular maps 951 shift to deliver the full field of view to the user without angular cross-talk. Light field display 950 having hexapolar symmetry may enable a simple and direct alignment procedure including rotation of multi-lenslet array 953 about its center (e.g., along a Z-axis, normal to the XY plane), and translations about the XY plane.

Figure 10:
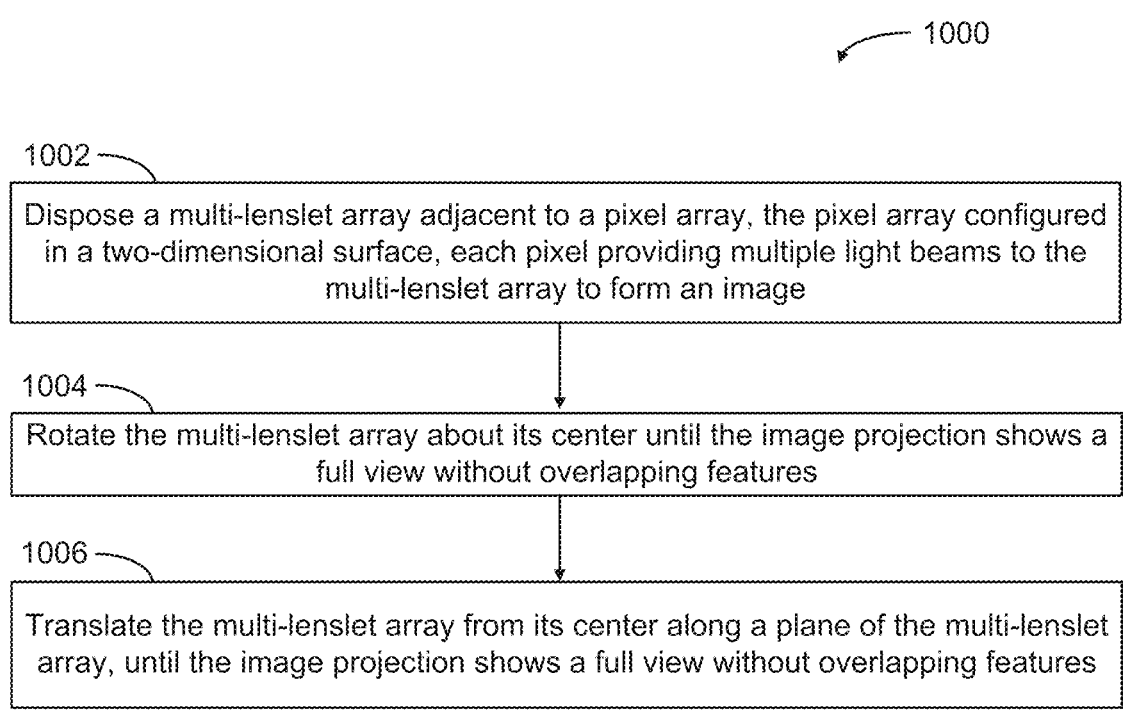
FIG. 10 is a flowchart illustrating steps in a method for aligning a multi-lenslet array with a light field display, according to some embodiments.

FIG. 10 is a flowchart illustrating steps in a method 1000 for mechanically aligning a multi-lenslet array with a light field display, according to some embodiments. According to some embodiments, the multi-lenslet array and the light field display may be included in an HMD device as disclosed herein (e.g., HMD devices 100, 300, and 700). The HMD may include a pixel array having multiple pixels configured in a two-dimensional surface (e.g., pixel arrays 120, 320, 420, 520, 620, 720, and 920), each pixel providing multiple light beams forming an image provided to a user (e.g., light beams 123, 423, 523, and 823). The HMD device may also include an optical element configured to provide a central portion of an FOV for the image through an eyebox that limits a volume including a pupil of the user (e.g., optical elements 130, 330, 430, 630, and 730, and eyeboxes 121, 421, 521, and 821). In some embodiments, the HMD device also includes an optical element configured to provide a peripheral portion of the field of view for the image through the eyebox (e.g., optical elements 153, 353, 453, 553, 653, 753, and 953). Methods consistent with the present disclosure may include at least one or more of the steps in method 1100 performed in a different order, simultaneously, quasi-simultaneously, or overlapping in time.

Step 1002 includes disposing a multi-lenslet array adjacent to a pixel array, the pixel array configured in a two-dimensional surface, each pixel providing multiple light beams to the multi-lenslet array to form an image.

Step 1004 includes rotating the multi-lenslet array about an axis perpendicular to a surface of at least one lenslet to reduce overlapping features or repeated features in the image. In some embodiments, step 1004 includes rotating the multi-lenslet array about an axis of a conical section substantially parallel to the multi-lenslet array.

Step 1006 includes translating the multi-lenslet array from its center along a plane of the multi-lenslet array to reduce overlapping features or repeated features in the image. In some embodiments, the multi-lenslet array includes at least one lenslet having a liquid crystal configured to change a focal length upon electromagnetic actuation, and step 1006 further includes actuating the at least one lenslet to correct a projection of the image.

Figure 11:
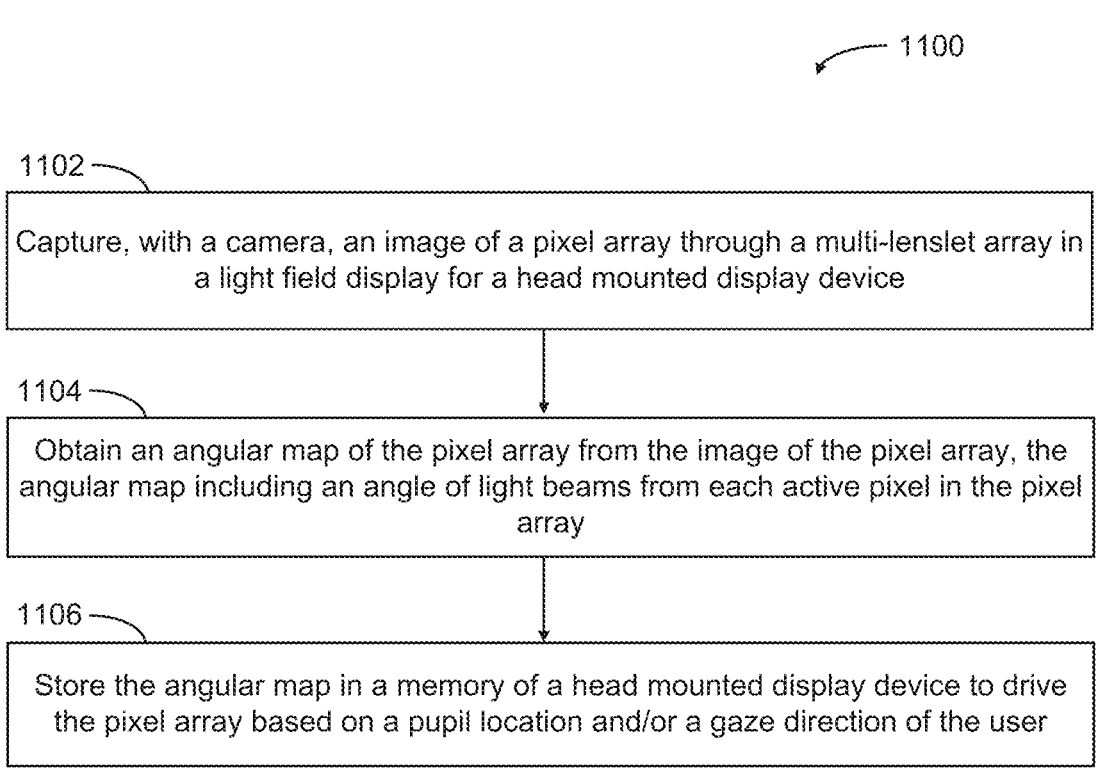
FIG. 11 is a flowchart illustrating steps in a method for digitally calibrating a light field display, according to some embodiments.

FIG. 11 is a flowchart illustrating steps in a method for digitally calibrating a light field display, according to some embodiments. Consistent with the present disclosure, a multi-lenslet array in the light field display may be included in an HMD device as disclosed herein (e.g., HMD devices 100, 300, and 700). The HMD may include a pixel array having multiple pixels configured in a two-dimensional surface (e.g., pixel arrays 120, 320, 420, 520, 620, 720, and 920), each pixel providing multiple light beams forming an image provided to a user (e.g., light beams 123, 423, 523, and 823). The HMD device may also include an optical element configured to provide a central portion of an FOV for the image through an eyebox that limits a volume including a pupil of the user (e.g., optical elements 130, 330, 430, 630, and 730, and eyeboxes 121, 421, 521, and 821). In some embodiments, the HMD device also includes an optical element configured to provide a peripheral portion of the field of view for the image through the eyebox (e.g., optical elements 153, 353, 453, 553, 653, 753, and 953). In some embodiments, a digital calibration of a light field display as disclosed herein may include creating multiple angular maps of the pixel array, each angular map associated with a pupil location and/or a gaze direction of the user, and storing the angular maps in a memory of the HMD device (cf. angular maps 951, and memory 122). Methods consistent with the present disclosure may include at least one or more of the steps in method 1100 performed in a different order, simultaneously, quasi-simultaneously, or overlapping in time.

Step 1102 includes capturing, with a camera, an image of a light field display through the multi-lenslet array. In some embodiments, step 1102 is performed after the multi-lenslet array is placed over the pixel array according to the better mechanical and optical tolerances available for manufacturing the light field display (cf. method 1000).

Step 1104 includes obtaining an angular map of the pixel array from the image of the light field display, the angular mapping including an angle value of light beams from each active pixel in the pixel array.

Step 1106 includes storing the angular map of the pixel array in a memory of a head mounted display device to drive the pixel array in the light field display based on a pupil location and/or a gaze direction of the user.

Figure 12:
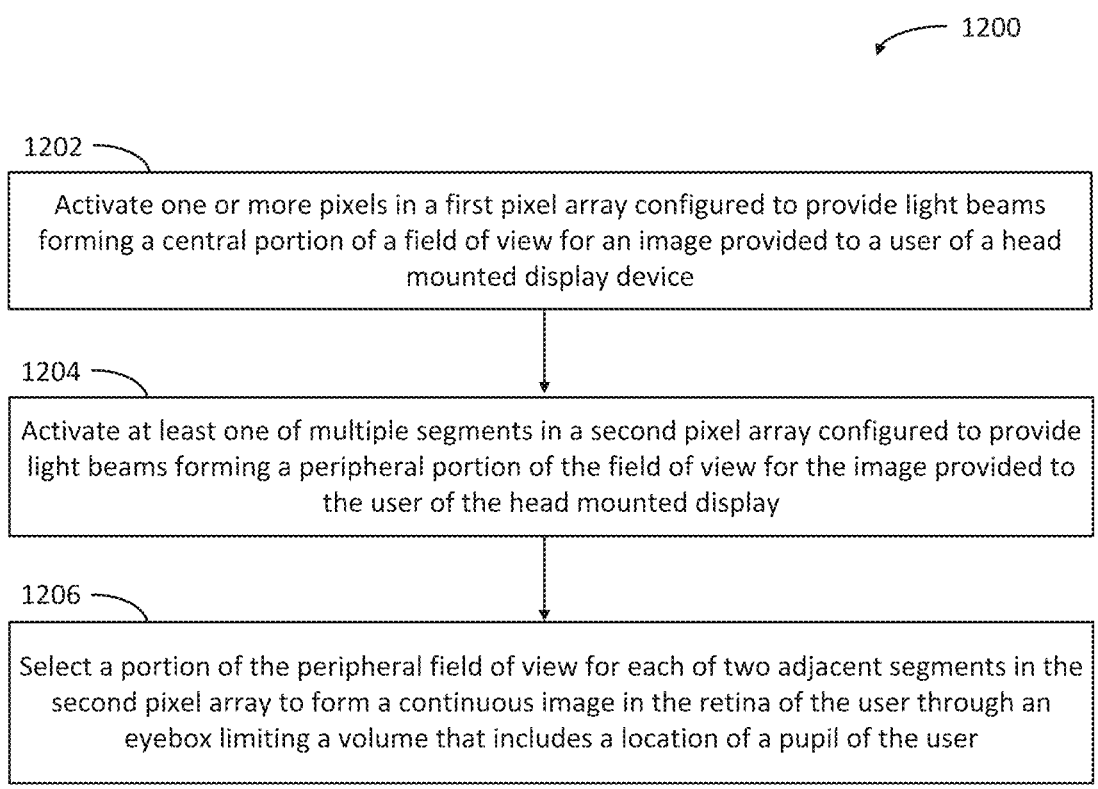
FIG. 12 is a flowchart illustrating steps in a method for providing a peripheral field of view to a user of an HMD device having a light field display, according to some embodiments.

FIG. 12 is a flowchart illustrating steps in a method 1200 for providing a peripheral field of view to a user of an HMD device having a light field display, according to some embodiments. According to some embodiments, the HMD device may include a multi-lenslet array and a light field display as disclosed herein (e.g., HMD devices 100, 300, and 700). The HMD may include a pixel array having multiple pixels configured in a two-dimensional surface (e.g., pixel arrays 120, 320, 420, 520, 620, 720, and 920), each pixel providing multiple light beams forming an image provided to a user (e.g., light beams 123, 423, 523, and 823). The HMD device may also include an optical element configured to provide a central portion of an FOV for the image through an eyebox that limits a volume including a pupil of the user (e.g., optical elements 130, 330, 430, 630, and 730, and eyeboxes 121, 421, 521, and 821). In some embodiments, the HMD device also includes an optical element configured to provide a peripheral portion of the field of view for the image through the eyebox (e.g., optical elements 153, 353, 453, 553, 653, 753, and 953). Methods consistent with the present disclosure may include at least one or more of the steps in method 1200 performed in a different order, simultaneously, quasi-simultaneously, or overlapping in time.

Step 1202 includes activating one or more pixels in a first pixel array configured to provide light beams forming a central portion of an FOV for an image provided to a user of the HMD.

Step 1204 includes activating at least one of multiple segments in a second pixel array configured to provide light beams forming a peripheral portion of the FOV for the image provided to the user of the HMD. In some embodiments, step 1204 may include selecting the at least one of multiple segments based on an angular map of the second pixel array stored in a memory, wherein the angular map associates an active segment of the pixel array with a pupil location and/or a gaze direction of the user.

Step 1206 includes selecting a portion of the peripheral field of view for each of two adjacent segments in the second pixel array to form a continuous image in the retina of the user through an eyebox limiting a volume that includes a location of a pupil of the user.

Hardware Overview

Figure 13:
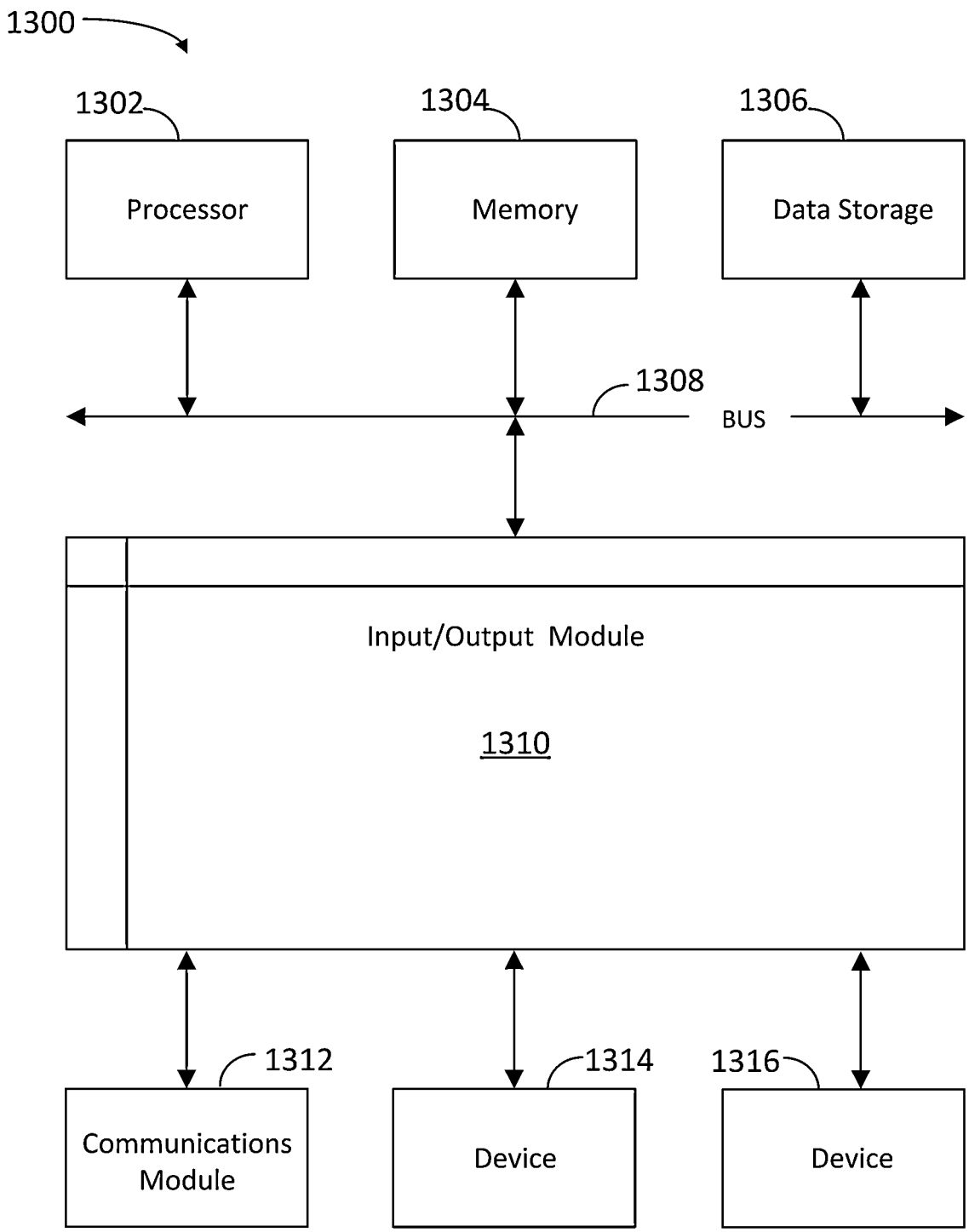
FIG. 13 is a block diagram illustrating an exemplary computer system with which the methods of FIGS. 10, 11 and 12 can be implemented, according to some embodiments.

FIG. 13 is a block diagram illustrating an exemplary computer system 1300 with which HMD device 100 of FIG. 1A, and methods 1100 and 1200 can be implemented. In certain aspects, computer system 1300 may be implemented using hardware or a combination of software and hardware, either in a dedicated server, or integrated into another entity, or distributed across multiple entities. Computer system 1300 may include a desktop computer, a laptop computer, a tablet, a phablet, a smartphone, a feature phone, a server computer, or otherwise. A server computer may be located remotely in a data center or be stored locally.

Computer system 1300 includes a bus 1308 or other communication mechanism for communicating information, and a processor 1302 (e.g., processor 112) coupled with bus 1308 for processing information. By way of example, the computer system 1300 may be implemented with one or more processors 1302. Processor 1302 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1300 can include, in addition to hardware, code that creates an execution environment for the computer program in question, e.g., code that constitutes processor firmware, a protocol stack, a database management system, an operating system, or a combination of one or more of them stored in an included memory 1304 (e.g., memory 122), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 1308 for storing information and instructions to be executed by processor 1302. The processor 1302 and the memory 1304 can be supplemented by, or incorporated in, special purpose logic circuitry.

The instructions may be stored in the memory 1304 and implemented in one or more computer program products, e.g., one or more modules of computer program instructions encoded on a computer-readable medium for execution by, or to control the operation of, the computer system 1300, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1304 may also be used for storing temporary variable or other intermediate information during execution of instructions to be executed by processor 1302.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1300 further includes a data storage device 1306 such as a magnetic disk or optical disk, coupled with bus 1308 for storing information and instructions. Computer system 1300 may be coupled via input/output module 1310 to various devices. Input/output module 1310 can be any input/output module. Exemplary input/output modules 1310 include data ports such as USB ports. The input/output module 1310 is configured to connect to a communications module 1312. Exemplary communications modules 1312 include networking interface cards, such as Ethernet cards and modems. In certain aspects, input/output module 1310 is configured to connect to a plurality of devices, such as an input device 1314 and/or an output device 1316. Exemplary input devices 1314 include a keyboard and a pointing device, e.g., a mouse or a trackball, by which a consumer can provide input to the computer system 1300. Other kinds of input devices 1314 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 1316 include display devices, such as an LCD (liquid crystal display) monitor, for displaying information to the consumer.

According to one aspect of the present disclosure, HMD device 100 can be implemented, at least partially, using a computer system 1300 in response to processor 1302 executing one or more sequences of one or more instructions contained in memory 1304. Such instructions may be read into memory 1304 from another machine-readable medium, such as data storage device 1306. Execution of the sequences of instructions contained in main memory 1304 causes processor 1302 to perform the process steps described herein. One or more processors in a multi-processing arrangement may also be employed to execute the sequences of instructions contained in memory 1304. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1300 can include clients and servers. A client and server are generally remote from each other and typically interact through a communication network. The relationship of client and server arises by virtue of computer programs running on the respective computers and having a client-server relationship to each other. Computer system 1300 can be, for example, and without limitation, a desktop computer, laptop computer, or tablet computer. Computer system 1300 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1302 for execution. Such a medium may take many forms, including, but not limited to, non-volatile media, volatile media, and transmission media. Non-volatile media include, for example, optical or magnetic disks, such as data storage device 1306. Volatile media include dynamic memory, such as memory 1304. Transmission media include coaxial cables, copper wire, and fiber optics, including the wires forming bus 1308. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A device for virtual reality imaging, comprising:
a pixel array including multiple pixels configured in a two-dimensional surface, each pixel providing multiple light beams forming an image provided to a user;
a first optical element configured to provide a central portion of a field of view for the image through an eyebox that limits a volume including a pupil of the user; and
a conical optical element configured to provide a peripheral portion of the field of view for the image through the eyebox, wherein the peripheral portion of the field of view comprises at least one steradian of a user's field of view at a resolution of at least fifteen arcminutes, wherein:
the pixel array includes a conical display that wraps around the first optical element, and
the conical optical element is a lenslet array that wraps around the first optical element to provide the peripheral portion of the field of view for the image through the eyebox.

2. The device of claim 1, wherein the conical optical element includes a lenslet array to provide a segmented view of the peripheral portion of the field of view, wherein the segmented view forms a continuous projection of the image on a retina of the user.

3. The device of claim 1, wherein the conical optical element is a freeform lenslet array, and wherein the two-dimensional surface of the pixel array is flat.

4. The device of claim 1, wherein the conical optical element is a lenslet array that includes a hexapolar tessellation configuration.

5. The device of claim 1, wherein the two-dimensional surface follows a one-dimensional curvature.

6. The device of claim 1, wherein the pixel array includes one of a flexible organic light emitting diode array, a flexible liquid crystal display, or a light emitting diode array.

7. The device of claim 1, wherein the conical optical element comprises a lenslet array with multiple lenslets arranged with a pitch greater than a fourth of a focal length of a lenslet, and wherein the light beams from a single pixel pass through the eyebox at a unique angle.

8. The device of claim 1, wherein the conical optical element comprises a lenslet array and the pixel array includes segmented portions of multiple active pixels separated by a gap of inactive pixels, wherein two sub-portions of the peripheral portion of the field of view of the image from two adjacent segmented portions of multiple active pixels form a continuous image on a retina of the user, and the light beams from the active pixels go through the eyebox at an angle that is unique for each pixel, based on a location of the pupil of the user.

9. The device of claim 1, wherein the conical optical element comprises a lenslet array having lenslets with a numerical aperture such that when disposed at a distance of a focal length from the pixel array, two adjacent lenslets generate two collimated beams of light from a same pixel that do not overlap with the eyebox.

10. A display, comprising:
a pixel array configured in a conical surface;
a memory, storing multiple instructions; and
one or more processors configured to execute the instructions to activate each of multiple segments in the pixel array to emit light beams forming a portion of a peripheral field of view of an image, each portion providing a different field of view frustum of the image, wherein:
the image is projected on a retina of a user of a head mounted display through an eyebox delimiting a position of a pupil of the user, and
the memory includes calibration instructions to cause the one or more processors to select the peripheral field of view of the image and to modify an angular mapping of the pixel array into a retina of the user, based on a gaze direction of the user and the position of the pupil.

11. The display of claim 10, further comprising a multi-lenslet array disposed adjacent to the pixel array, wherein the portion of the peripheral field of view comprises at least one steradian of a user's field of view at a resolution of at least fifteen arcminutes.

12. The display of claim 10, wherein the instructions further cause the one or more processors to select a portion of the peripheral field of view to each of two adjacent segments to form a continuous image in the retina of the user, through the eyebox.

13. The display of claim 10, wherein a gap of inactive pixels between two adjacent segments is selected so that the light beams provided by each of two adjacent segments in the pixel array forms a continuous, no-crosstalk image in the retina of the user, through the eyebox.

14. The display of claim 10, wherein the instructions further include an instruction indicative of a position of the pupil of the user within the eyebox.

15. The display of claim 10, further comprising a sensor configured to provide a location information for the pupil of the user within the eyebox.

16. A method, comprising:
capturing, with a camera, an image of a conical pixel array through a multi-lenslet array in a light field display for a head mounted display device, the image associated with a pupil location of a user of the head mounted display device;
obtaining an angular map of the conical pixel array from the image of the conical pixel array, wherein the angular map includes an angle of multiple light beams from each active pixel in the conical pixel array; and
storing the angular map in a memory of the head mounted display device, based on the pupil location.

17. The method of claim 16, further comprising storing, in the memory of the head mounted display device, an instruction to activate a segment of the conical pixel array based on the angular map and the pupil location.

18. The method of claim 16, wherein storing the angular map in a memory of the head mounted display device comprises storing a correction factor in the angular map based on a fit parameter of the head mounted display device on the user.

* * * * *